(12) United States Patent
Maddux et al.

(10) Patent No.: US 10,999,977 B2
(45) Date of Patent: May 11, 2021

(54) STEM SENSOR

(71) Applicant: Monsanto Technology LLC, St. Louis, MO (US)

(72) Inventors: Andrew Maddux, St. Louis, MO (US); John E. Pritchard, St. Louis, MO (US); Joshua W. Taylor, St. Louis, MO (US)

(73) Assignee: Monsanto Technology LLC, St. Louis, MO (US)

( * ) Notice: Subject to any disclaimer, the term of this patent is extended or adjusted under 35 U.S.C. 154(b) by 257 days.

(21) Appl. No.: 16/089,796

(22) PCT Filed: Mar. 29, 2017

(86) PCT No.: PCT/US2017/024713
§ 371 (c)(1),
(2) Date: Sep. 28, 2018

(87) PCT Pub. No.: WO2017/172889
PCT Pub. Date: Oct. 5, 2017

(65) Prior Publication Data
US 2019/0116740 A1    Apr. 25, 2019

Related U.S. Application Data

(60) Provisional application No. 62/314,446, filed on Mar. 29, 2016.

(51) Int. Cl.
| | |
|---|---|
| *A01G 9/06* | (2006.01) |
| *A01G 7/06* | (2006.01) |
| *G01B 11/02* | (2006.01) |
| *G01B 11/08* | (2006.01) |
| *A01M 7/00* | (2006.01) |

(Continued)

(52) U.S. Cl.
CPC .............. *A01G 7/06* (2013.01); *A01C 21/007* (2013.01); *A01M 7/00* (2013.01); *A01M 17/00* (2013.01); *G01B 11/02* (2013.01); *G01B 11/08* (2013.01); *A01B 79/005* (2013.01); *G01V 3/10* (2013.01)

(58) Field of Classification Search
CPC ...... A01G 17/005; A01G 17/00; A01G 18/30; A01G 18/50; A01G 18/55; A01G 22/00; A01G 20/00
See application file for complete search history.

(56) References Cited

U.S. PATENT DOCUMENTS

| | | | |
|---|---|---|---|
| 3,731,477 A * | 5/1973 | Coon | .................... A01D 45/263 56/327.1 |
| 4,532,757 A | 8/1985 | Tutle | |

(Continued)

FOREIGN PATENT DOCUMENTS

WO    2016025848 A1    2/2016

OTHER PUBLICATIONS

International Search Report from corresponding PCT/US2017/24713 dated Jun. 16, 2017.

*Primary Examiner* — Kristen C Hayes
(74) *Attorney, Agent, or Firm* — Sandberg Phoenix and von Gontard

(57) ABSTRACT

A mechanized, non-disruptive plant touch, or contact, sensing system for detecting by touch, or contact, the precise location of plants and/or plant stems relative to a machine in motion, and then disengage the plant without significantly affecting the plant's health or development.

20 Claims, 20 Drawing Sheets

(51) Int. Cl.
*A01C 21/00* (2006.01)
*A01M 17/00* (2006.01)
A01B 79/00 (2006.01)
G01V 3/10 (2006.01)

(56) References Cited

U.S. PATENT DOCUMENTS

| | | | | |
|---|---|---|---|---|
| 5,031,705 | A | * 7/1991 | Clemens | ............... A01B 39/16 |
| | | | | 172/233 |
| 8,136,335 | B2 | * 3/2012 | Dobson | ................. A01D 45/26 |
| | | | | 56/327.1 |
| 8,943,746 | B2 | * 2/2015 | Hartsook | ................. A01G 7/06 |
| | | | | 47/1.5 |
| 9,167,752 | B2 | 10/2015 | Hartsook et al. | |
| 10,448,571 | B1 | * 10/2019 | McFarland | .......... A01G 17/023 |
| 2009/0282794 | A1 | 11/2009 | Wilcox et al. | |

\* cited by examiner

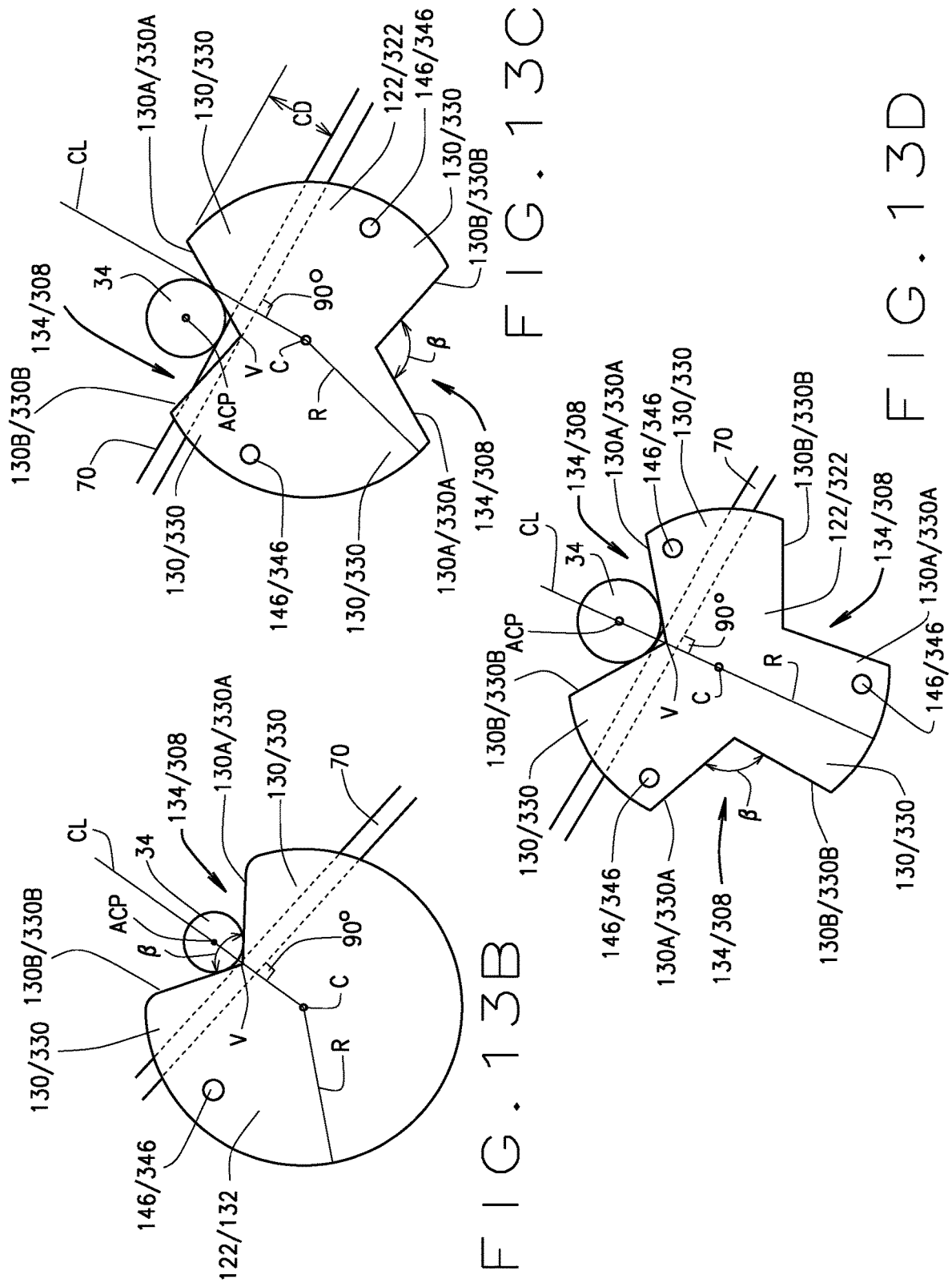

STEM SENSOR

CROSS-REFERENCE TO RELATED APPLICATIONS

The present application is the US national stage under 35 U.S.C. § 371 of International Application No. PCT/US2017/024713, which was filed on Mar. 29, 2017, and which claims the priority of U.S. Application No. 62/314,446, filed on Mar. 29, 2016, the disclosures of which are incorporated herein by reference in their entirety.

FIELD

The present teachings relate to screening plants for disease tolerance, and more particularly to systems and methods for inoculating plants to be screened for disease tolerance.

BACKGROUND

The statements in this section merely provide background information related to the present disclosure and may not constitute prior art.

An important challenge of studying plants on a large scale is automating precision, non-disruptive sensing of plants or certain plant parts in a growing area, e.g. a large research field comprising thousands of plants. Current methods include humans moving through the growing area, using their natural touch and vision to determine the location of plants, and/or plant parts, and to apply desired treatments and/or collect desired information. Humans are able to use an extremely complicated combination of visual and contact sensing, along with articulated, dexterous appendages to contact and manipulate plants without damaging them. However, automating plant contact sensing systems and method with a similar level of sensitivity, precision, and accuracy are currently prohibitively complex and expensive.

Although some known non-contact optical/imaging sensors are non-disruptive, they do not directly confirm the presence of a plant by contact, or touch, and are thus prone to errors whenever unintended objects cross the sensor/emitter path. This is especially true in the unpredictable setting of a typical outdoor crop research field, for example, when trying to distinguish individual plants from overhead after a thick, overlapping canopy has formed. Weeds, side branches, dead sticks, and/or other debris common to agricultural fields present further challenges to optical/imaging-based sensing systems as well.

Precision, non-disruptive plant contact sensing can be utilized in many instances. For example, in plant breeding and selection processes, genotypic and/or phenotypic data can be gathered from inoculated treated plants, e.g., corn plants, to assess crop performance, e.g., by testing a plant's tolerance to one or more particular environmental stresses and/or exogenously-applied treatments and/or tolerance to one or more pathogens, such as viral, bacterial or fungal pathogens. For example, by infecting corn stems with an agriculture treatment agent comprising a stem rot pathogens, the efficacy of genetic traits related to corn stem rot tolerance can be tested. Similarly, a non-disruptive plant contact sensor can be used to more effectively apply precision agriculture treatment agents to a plant to test the agent's effectiveness, for example, to test the effectiveness of a pesticide (e.g. an insecticide, fungicide, antimicrobial, and/or herbicide).

Known methods and systems for sensing the plants and/or applying an inoculant to infect the plant stems are typically tedious processes performed by manually injecting plants with the pathogen, manually spraying the pathogen on plants, or manually applying a solution containing a pathogen to a manually abraded stem. Such hand performed inoculation methods are typically unergonomic, the inoculation throughput rate is relatively low, and the accuracy/consistency of inoculation is often unpredictable.

SUMMARY

Disclosed herein is a mechanized, non-disruptive plant touch/contact sensing system. In various embodiments, the system and methods described herein enable the ability to engage and detect by touch, or contact, the precise location of plants and/or plant stems relative to a machine in motion, and then disengage the plant without significantly affecting the plant's health or development. The systems and methods of the present disclosure can be implemented and utilized in a broad range of applications, for example, precision injection and/or inoculation of plant stems.

By gently touching/contacting the stem of a plant, the plant touch/contact sensor systems and methods described herein eliminate the above described inconveniences, difficulties, obstacles and various types of errors. In various embodiments, the present disclosure can include a plant touch/contact sensor that, in various instances, can comprise a notch positioned to receive a stem and cradle the stem within the notch by contacting the stem on at least two different points along the stem circumference. In various embodiments, the stem is cradled between opposing walls or sides of the notch at some point during contact with the sensor. In various implementations, the notch can be part of a rotating wheel, disk, drum, cog, etc., or part of a sliding or other mechanism. It is envisioned that the sensitivity of the system can be calibrated to detect different types of plants and different types of plant stems, including plant stems in different stages of development.

In various embodiments, non-disruptive plant touch/contact sensing system can comprise one or more centering assembly that comprises a wheel with at least one notch. The walls of the notch are capable of contacting the stem from at least two different points along the stem circumference and cradling the stem as the system moves alongside the plant.

In various embodiments, the present disclosure can comprise non-disruptive plant touch/contact sensing systems and methods that include a stem inoculation assembly for individually sensing each of a plurality of plant stems by non-disruptive touch/contact and inoculating the plant stems with a desired pathogen at a high-throughput. In various implementations, the non-disruptive plant touch/contact sensing system is mountable to a mobile platform that is structured and operable to move along a ground surface adjacent a row of plants.

The present disclosure of the non-disruptive plant touch/contact sensing system and methods includes detailed examples of a wide range of instruments that benefit from accurate orientation relative to their targets, for example, those that apply a treatment to plants and/or the surrounding planting area/environment and those that collect information (sense) about crop plants and/or the surrounding planting area/environment. Nonlimiting examples are needles for inoculation, cameras for capturing optical information, nozzles for applying chemicals, blades for collecting tissue, etc.

Other embodiments, aspects, and advantages will become apparent from the following detailed description taken in conjunction with the accompanying drawings which illustrate, by way of example, the principles of the described embodiments. It should be understood that the description and specific examples are intended for purposes of illustration only and are not intended to limit the scope of the present teachings.

DRAWINGS

The drawings described herein are for illustration purposes only and are not intended to limit the scope of the present teachings in any way.

FIGS. 13B through 13E are schematic top views of the centering sensor of the mechanized, non-disruptive plant contact sensing system shown in FIG. 11, in accordance with various other embodiments of the present disclosure.

Corresponding reference numerals indicate corresponding parts throughout the several views of drawings.

DETAILED DESCRIPTION

Figure 1:
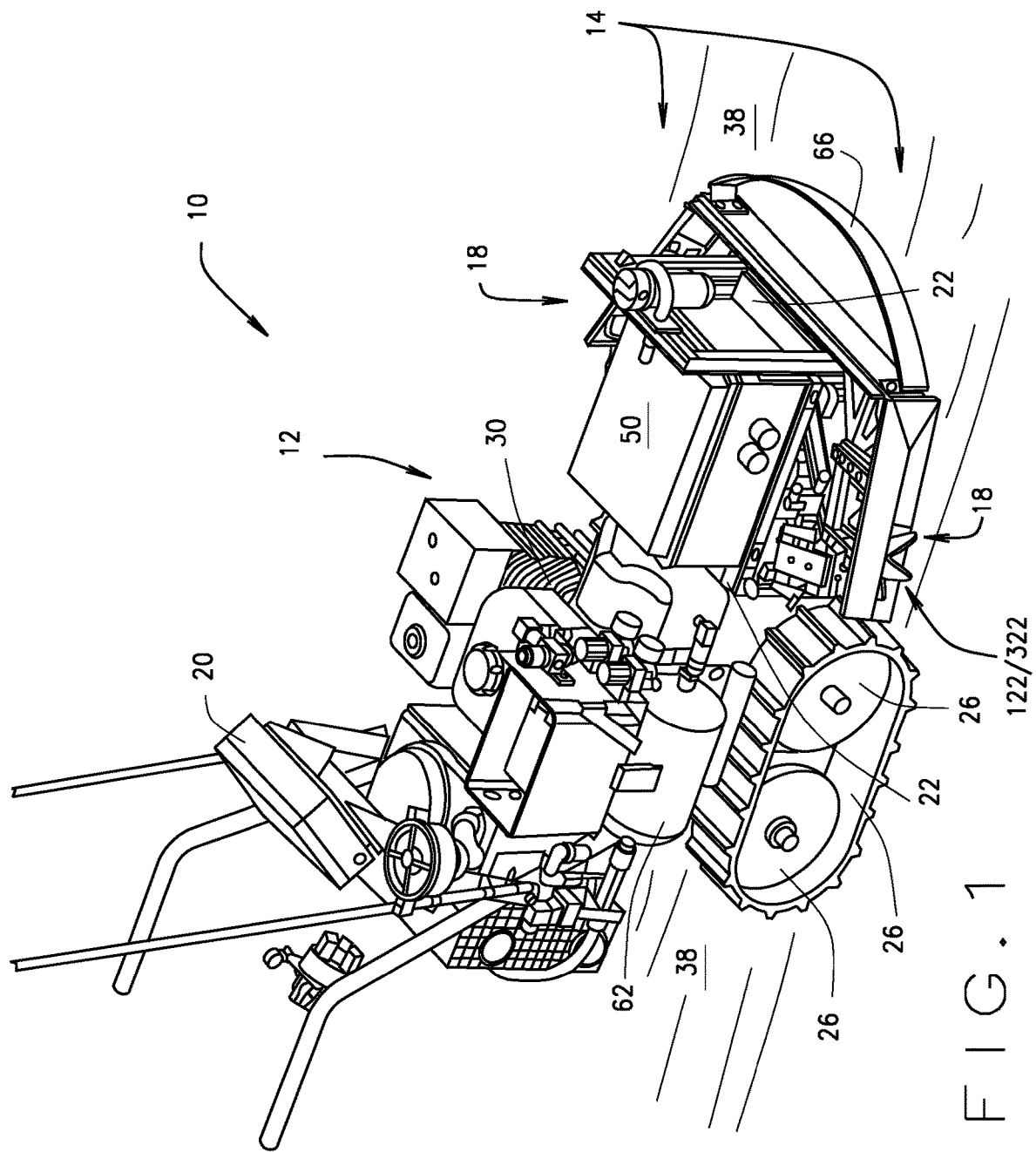
FIG. 1 is an isometric view of a mechanized, non-disruptive plant contact sensing system, exemplarily illustrated as a stem inoculation system that includes a stem inoculation assembly that includes at least one stem inoculation mechanism, in accordance with various embodiments of the present disclosure.

The following description is merely exemplary in nature and is in no way intended to limit the present teachings, application, or uses. Throughout this specification, like reference numerals will be used to refer to like elements. Additionally, the embodiments disclosed below are not intended to be exhaustive or to limit the invention to the precise forms disclosed in the following detailed description. Rather, the embodiments are chosen and described so that others skilled in the art can utilize their teachings. As well, it should be understood that the drawings are intended to illustrate and plainly disclose presently envisioned embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Unless otherwise defined, all technical and scientific terms used herein have the same meaning as commonly understood by one of ordinary skill in the art to which this disclosure belongs. The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps can be employed.

When an element, object, device, apparatus, component, region or section, etc., is referred to as being "on," "engaged to or with," "connected to or with," or "coupled to or with" another element, object, device, apparatus, component, region or section, etc., it can be directly on, engaged, connected or coupled to or with the other element, object, device, apparatus, component, region or section, etc., or intervening elements, objects, devices, apparatuses, components, regions or sections, etc., can be present. In contrast, when an element, object, device, apparatus, component, region or section, etc., is referred to as being "directly on," "directly engaged to," "directly connected to," or "directly coupled to" another element, object, device, apparatus, component, region or section, etc., there may be no intervening elements, objects, devices, apparatuses, components, regions or sections, etc., present. Other words used to describe the relationship between elements, objects, devices, apparatuses, components, regions or sections, etc., should be interpreted in a like fashion (e.g., "between" versus "directly between," "adjacent" versus "directly adjacent," etc.).

As used herein, the term "and/or" includes any and all combinations of one or more of the associated listed items. For example, A and/or B includes A alone, or B alone, or both A and B.

Although the terms first, second, third, etc. can be used herein to describe various elements, objects, devices, apparatuses, components, regions or sections, etc., these elements, objects, devices, apparatuses, components, regions or sections, etc., should not be limited by these terms. These terms may be used only to distinguish one element, object, device, apparatus, component, region or section, etc., from another element, object, device, apparatus, component, region or section, etc., and do not necessarily imply a sequence or order unless clearly indicated by the context.

It will be understood that various directions such as "upper", "lower", "bottom", "top", "left", "right", "first", "second" and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and nonlimiting.

As used herein, a test plot will be understood to mean a single field, or one of a plurality plots within a research field that has been subdivided into a plurality of plots. Each test plot typically comprises one or more rows of plants comprising from about 5 to about 15 or 20 plants in each row, wherein the plants are subject to various crop breeding and analytics research procedures and tests for developing various strains, hybrids, genotypes, etc. of plants. For example, test plots in a growing area can receive certain treatments (e.g. chemical applications to the plants and/or growing environment), and/or can comprise plants of certain genetics, and/or combinations thereof. Each test plot within a field is purposely separated from other test plots by a gap, or alleys, where no plants are grown. The gaps or alleys maintain the identity of the plant material within each respective test plot. Hence, there are typically many alleys in a research field, often comprising 10-30 feet of space with no plants.

As used herein, a microbe will be understood to be a microorganism, i.e. a microscopic living organism, which can be single celled or multicellular. Microorganisms are very diverse and include all the bacteria, archea, protozoa, fungi, and algae, especially cells of plant pathogens and/or plant symbiots. Certain animals are also considered microbes, e.g. rotifers. In various embodiments, a microbe can be any of several different microscopic stages of a plant or animal. Microbes also include viruses, viroids, and prions, especially those which are pathogens or symbiots to crop plants. In various embodiments, the microbe is part of an agriculture treatment agent that is applied to a plant and/or the plants environment.

As used herein the term plant refers to a whole plant, any part thereof, or a cell or tissue culture derived from a plant, comprising any of: whole plants, plant components or organs (e.g., leaves, stems, roots, etc.,), plant tissues, seeds, plant cells, and/or progeny of the same. A plant cell is a biological cell of a plant, taken from a plant or derived through culture from a cell taken from a plant.

As used herein the term fungus refers to a whole fungus, any part thereof, or a cell or tissue culture derived from a fungus, comprising any of whole fungus, fungus components or organs, fungal tissues, spores, fungal cells, including cells of hyphae and/or cells of mycelium, and/or progeny of the same. A fungus cell is a biological cell of a fungus, taken from a fungus or derived through culture from a cell taken from a fungus.

As used herein the phrase population of plants or plant population means a set comprising any number, including one, of individuals, objects, or data from which samples are taken for evaluation, e.g. estimating QTL effects and/or disease tolerance. Most commonly, the terms relate to a breeding population of plants from which members are selected and crossed to produce progeny in a breeding program. A population of plants can include the progeny of a single breeding cross or a plurality of breeding crosses, and can be either actual plants or plant derived material, or in silico representations of the plants. The population members need not be identical to the population members selected for use in subsequent cycles of analyses or those ultimately selected to obtain final progeny plants. Often, a plant population is derived from a single biparental cross, but can also derive from two or more crosses between the same or different parents. Although a population of plants can comprise any number of individuals, those of skill in the art will recognize that plant breeders commonly use population sizes ranging from one or two hundred individuals to several thousand, and that the highest performing 5-20% of a population is what is commonly selected to be used in subsequent crosses in order to improve the performance of subsequent generations of the population.

In various implementations, the devices/apparatuses/systems and methods described herein can be implemented by one or more computer programs executed by one or more processors. In such instances, the computer programs include processor executable instructions that are stored on a non-transitory, tangible, computer-readable medium. The computer programs can also include stored data. Non-limiting examples of the non-transitory, tangible, computer-readable medium are nonvolatile memory, magnetic storage, and optical storage.

Figure 2:
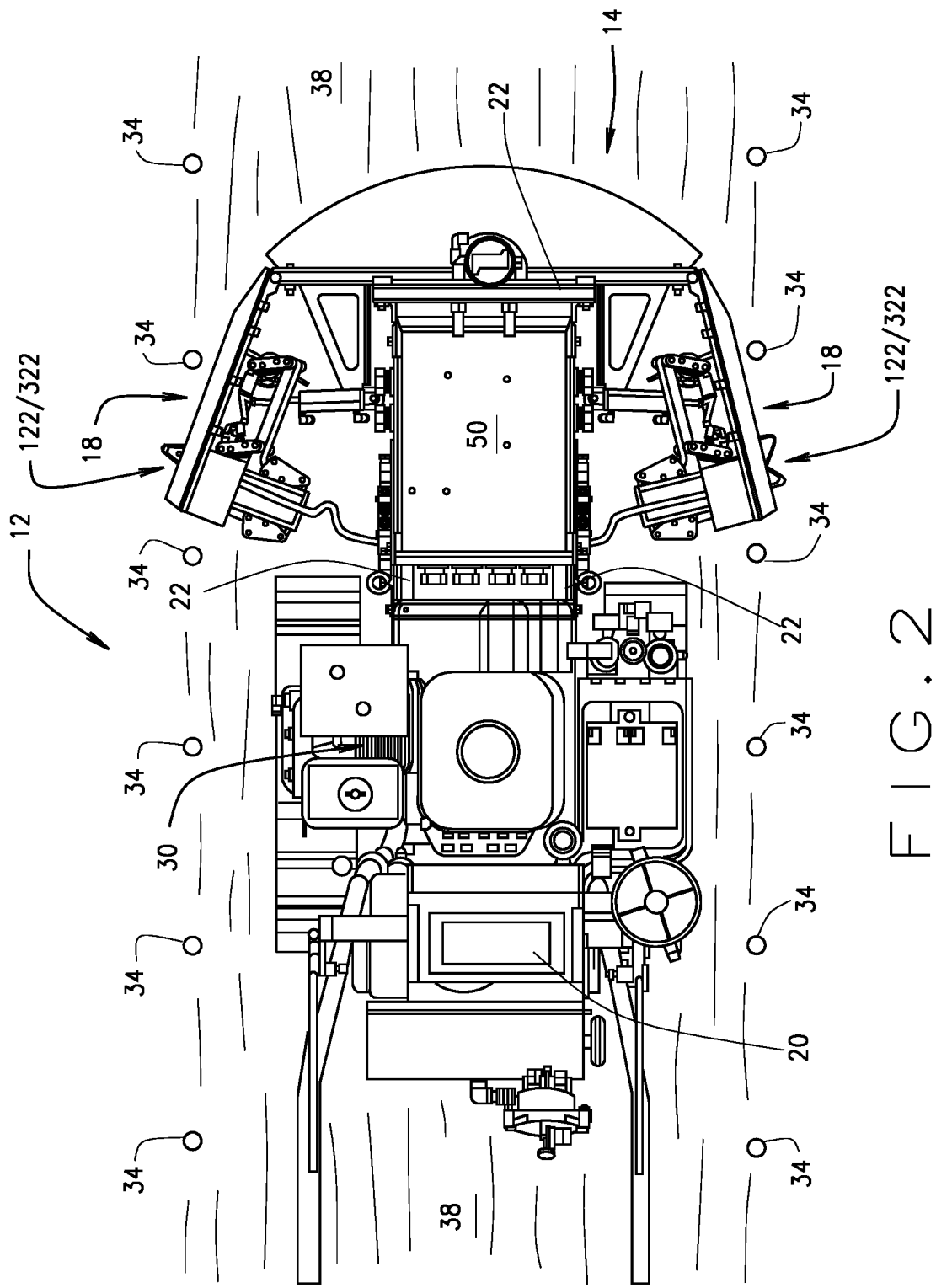
FIG. 2 is a top view of the stem inoculation system shown in FIG. 1, in accordance with various embodiments of the present disclosure.

Referring to FIGS. 1 and 2, the present disclosure provides mechanized, non-disruptive plant contact sensing system, exemplarily described in FIGS. 1-10B as a stem inoculation system 10, that is structured and operable to inoculate a plurality of plants by introducing pathogens, e.g., bacterial, viral or fungal pathogens, into the plant tissue for disease phenotyping and/or genotyping. For example, the system 10 can be employed to inoculate an entire test plot of plants with one or more stem rot pathogens such as *Anthracnose* (*Colletotrichum Graminicola*), *Fusarium, Gibberella* or *Diplodia*. Additionally, it is envisioned that the system 10 can be employed to inoculate plants for foliar disease pathogens such as Goss' wilt, Stewart's wilt, Gray Leaf Spot, Southern Leaf Blight, Northern Leaf Blight, common rust, etc. More particularly, the system 10, as disclosed herein, can be utilized to infect a plurality of plants at a high throughput rate with a substantially high rate of infection and a substantially consistent level of infection for all the plants. For example, the system 10 can be employed to infect the stems of an entire test plot of corn plants with *Anthracnose* at a high throughput rate with a substantially high rate of infestation and a substantially consistent level of infection for all the corn plants. The fluid, e.g., an agriculture treatment solution comprising an inoculum, injected by the system 10 can be a concentrated spore solution comprising particular disease spores mixed in suspension solution or media, e.g., a viscous or agar solution or media. More particularly, the inoculum can be formulated with a concentration of disease spores for infecting the test plants with any desired type of stem rot or foliar disease pathogen such as *Anthracnose* or *Fusarium*, or Goss' wilt, Stewart's wilt, Gray Leaf Spot, Southern Leaf Blight, Northern Leaf Blight, common rust, etc.

The system 10 generally includes a mobile platform 12 that is structured and operable to move along a ground surface 38 adjacent a row of plants to be inoculated, each plant having a stem 34 extending upward from, i.e., growing from, the ground surface 38. The mobile platform 12 has attached thereto a stem inoculation system 14 that includes one or more stem inoculation mechanisms 18, and a computer based system controller 20 that is structured and operable to control automated operations of the system 10. The mobile platform 12 can comprise any mobile platform suitably sized and structured for moving, self-propelled or otherwise, between two or more opposing rows of plants, e.g., corn plants, in a field such that the mobile platform 12 does contact the stems 34 of the plants, but one or more systems, devices, assemblies, mechanisms and/or apparatuses of the system 10 do contact the plants, as described herein. The mobile platform 12 generally includes a chassis 22 structured and operable to support and have connected thereto various systems, devices, assemblies, mechanisms, apparatuses, etc., of the system 10, and one or more terrestrial traversing devices 26 (e.g., one or more wheels with tires, and/or one or more wheels with tracks) rotationally mounted to the chassis 22 and structured and operable to allow the system 10 to be moved, e.g., rolled, and/or propelled through the field, across the ground 38 between the opposing rows of plants, i.e., between stems 34 in two or more rows of plants.

In various embodiments, the mobile platform 12 can additionally include a prime mover 30 that is structured and operable to generate torque (e.g., motive force, e.g., power) utilized to provide motive force for propelling the mobile platform 12 across the ground 38 between the opposing rows of plants, i.e., stems 34. Although the prime mover 30 is primarily described and illustrated herein as an internal combustion engine (ICE), it should be understood that the prime mover 30 can be an electric motor, a hybrid combination of an ICE and an electric motor, or any other suitable motor or engine and remain within the scope of the present disclosure. In embodiments in which the prime mover 42 is embodied as or comprises an ICE, the ICE can be configured to utilize any suitable combustible fuel, such as gasoline, diesel, natural gas, biofuel, some combination thereof, etc. In various embodiments, the mobile platform 12 of the system 10 can additionally include one or more control and steering handles 42 mounted to the back of the chassis 22 that is/are structured and operable to control movement and steering of the system 10.

Figure 3:
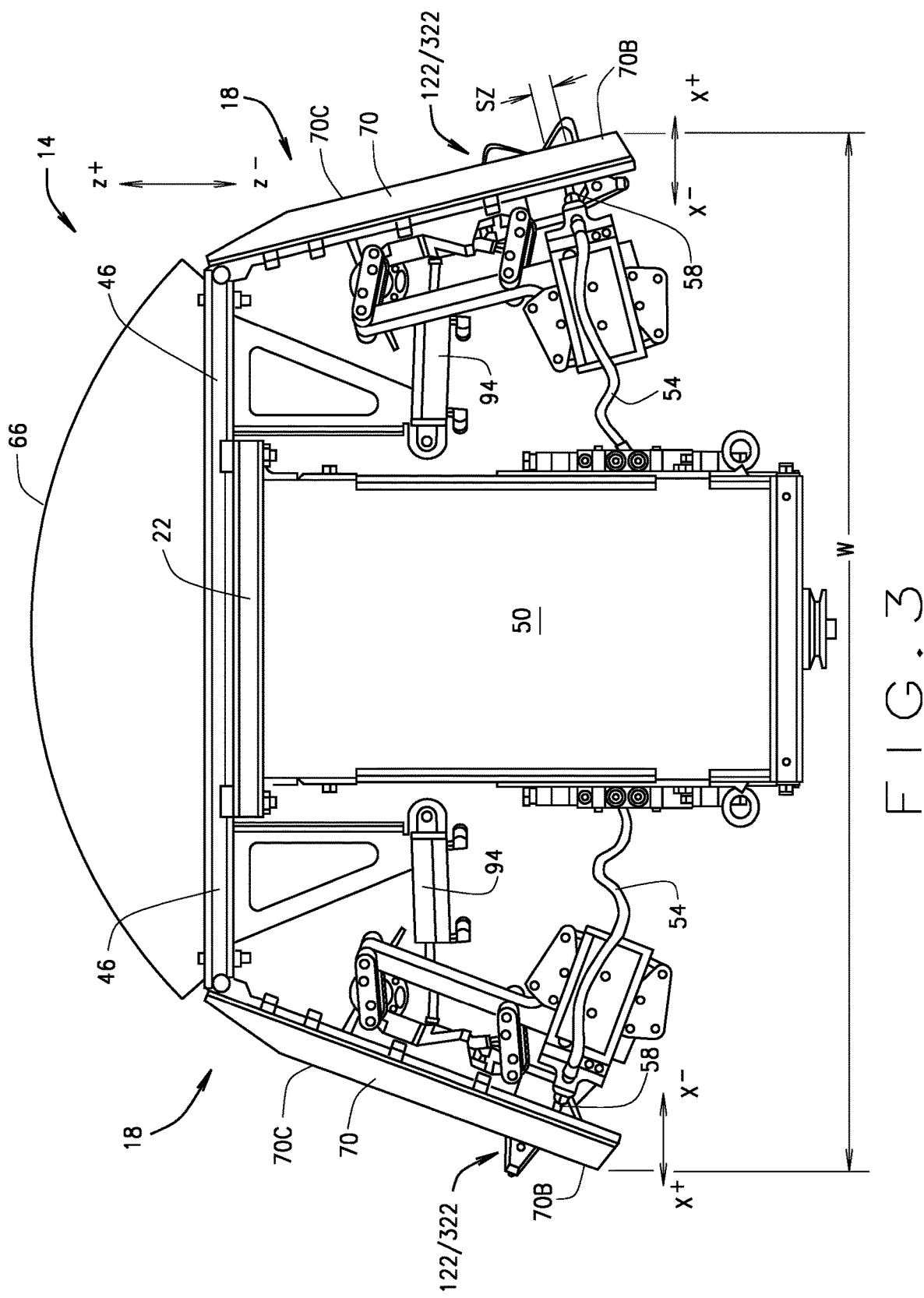
FIG. 3 is a top view of the stem inoculation assembly shown in FIG. 1 including a pair of stem inoculation mechanisms, in accordance with various embodiments of the present disclosure.
Figure 4:
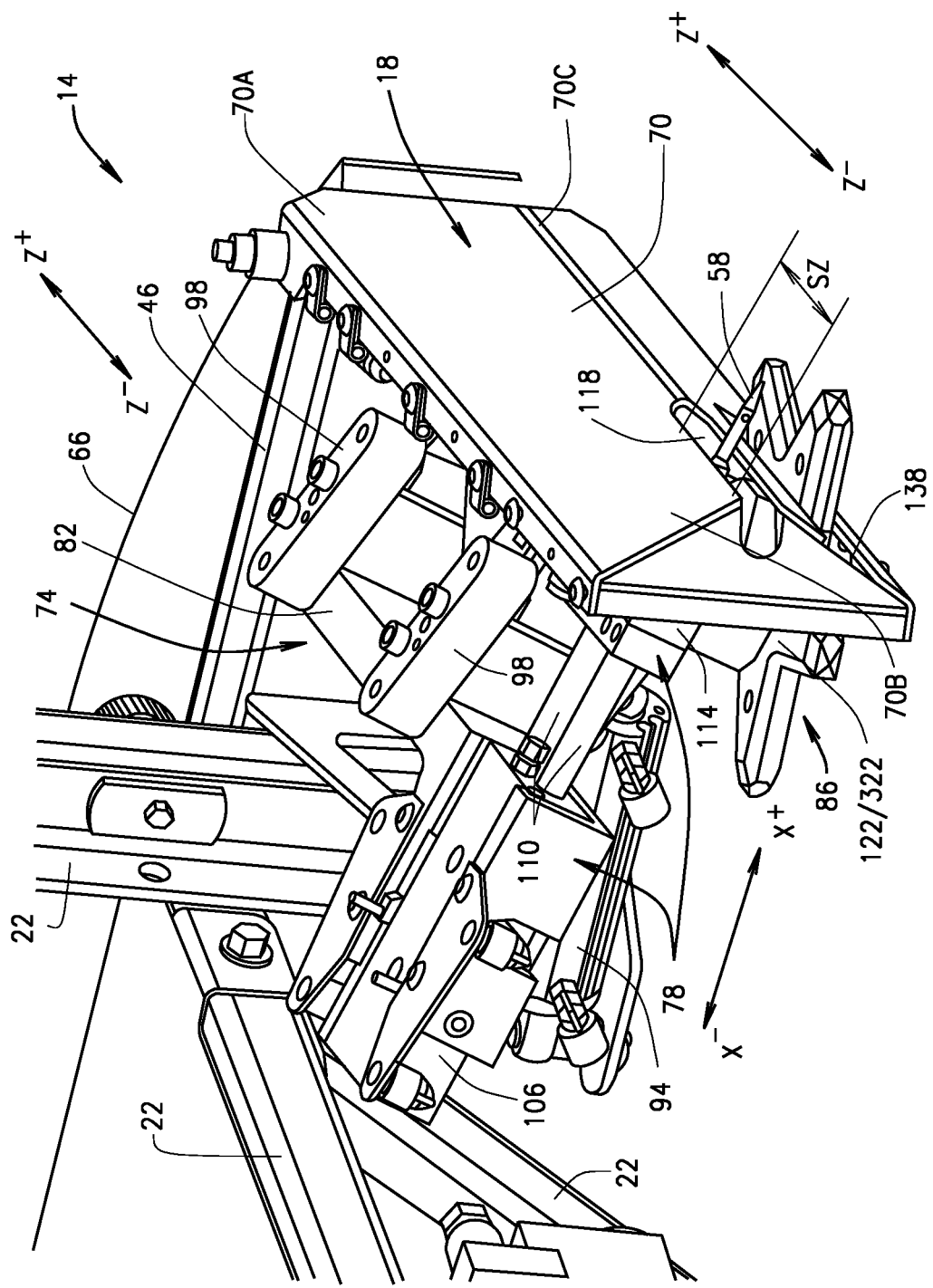
FIG. 4 is an isometric view of a stem inoculation mechanism shown in FIG. 1, in accordance with various embodiments of the present disclosure.
Figure 5:
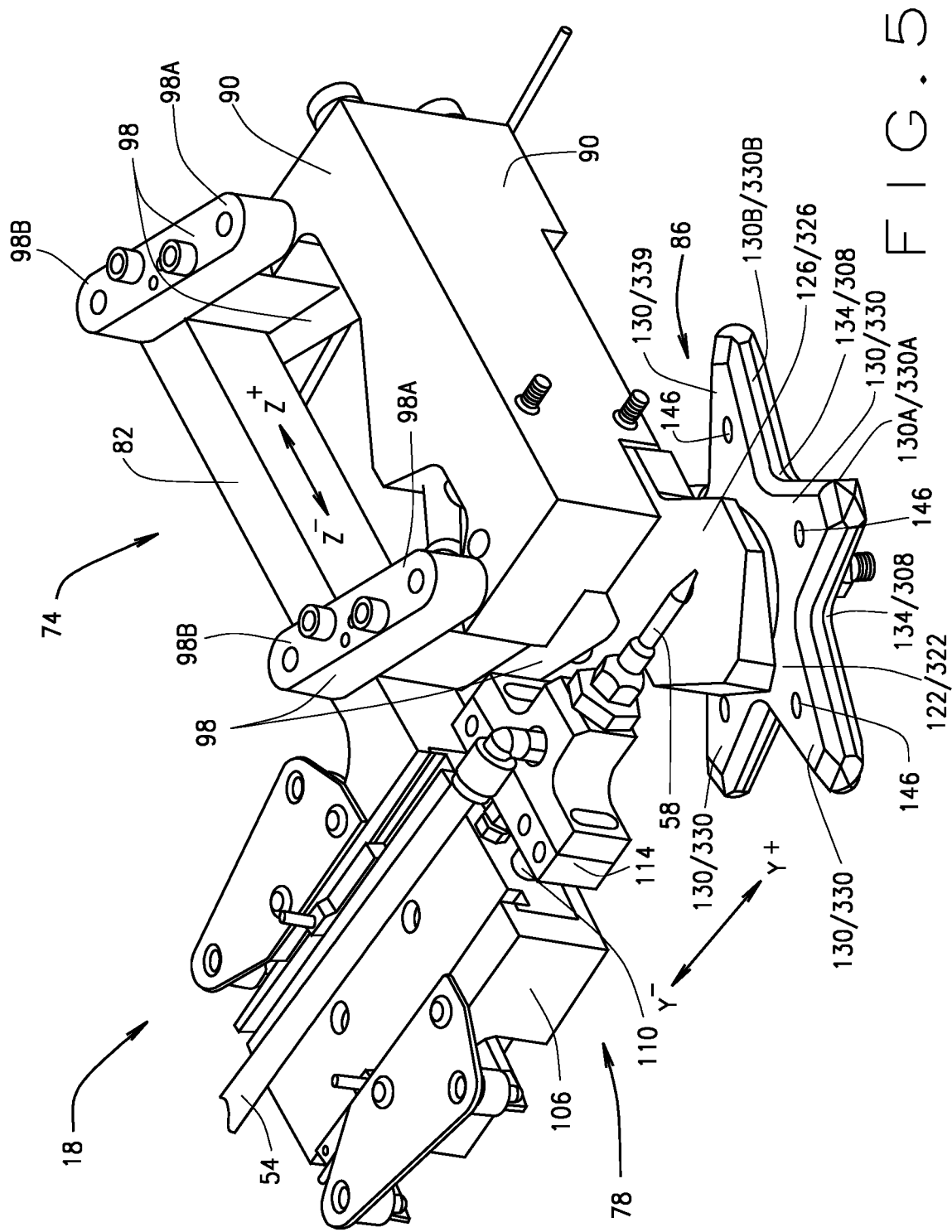
FIG. 5 is an isometric view of the stem inoculation mechanism shown in FIG. 4 having a guiderail removed, in accordance with various embodiments of the present disclosure.
Figure 6:
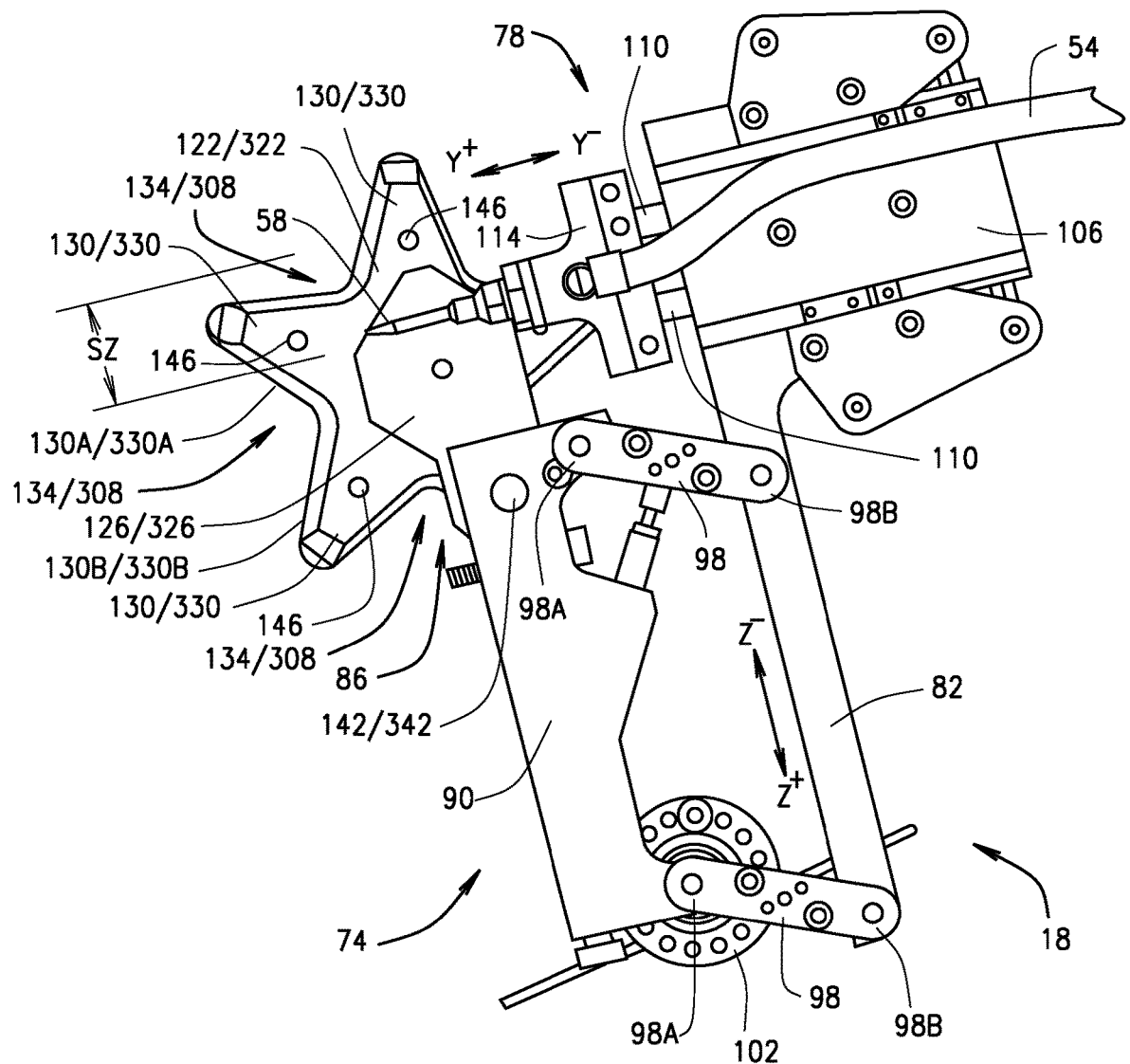
FIG. 6 is a top view of the stem inoculation mechanism shown in FIG. 5, in accordance with various embodiments of the present disclosure.
Figure 7:
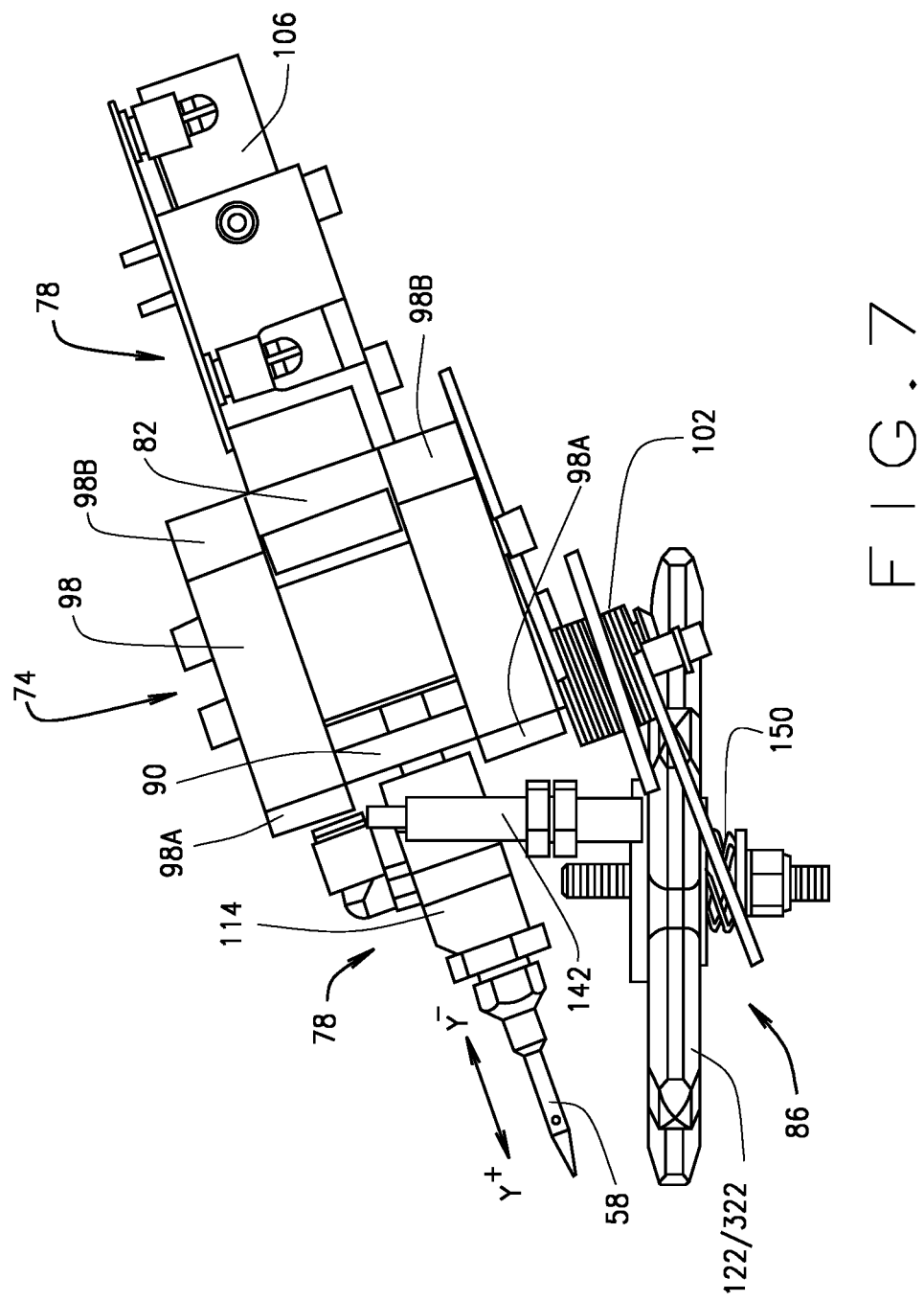
FIG. 7 is a front view of the stem inoculation mechanism shown in FIG. 5, in accordance with various embodiments of the present disclosure.

Referring now to FIG. 3, the stem inoculation assembly 14 is mounted to one or more portion of the mobile platform chassis 12. Particularly, in various embodiments, the inoculation assembly 14 comprises a carrier beam 46 that is mounted to a front portion of the chassis 22 such that the assembly 14 is generally disposed at a front end of the mobile platform 12. As described above, the inoculation assembly 14 additionally comprises at least one stem inoculation mechanism 18. Each inoculation mechanism 18 is structured and operable to inject the stem 34 of each plant in a respective row with an inoculum fluid as the mobile platform 12 moves along the ground surface 38 adjacent each plant stem 34. In various embodiments, the mobile platform 12 can move along the ground surface 38 adjacent each plant stem 34 at a substantially constant speed. In various embodiments, the carrier beam 46 can be adjustably mounted to the chassis 22 such that a distance above the ground of the carrier beam 46, and hence each mechanism 18, can be adjusted. Accordingly, a height of a strike zone SZ of each stem 34 (described further below) can be adjusted to a desired height. The assembly 14 additionally includes at least one fluid tank 50, e.g., inoculum tank 50, for retaining a quantity of fluid (e.g., inoculum), a plurality of fluid/inoculum flow tubes 54 operable to provide a flow of fluid/inoculum, from the fluid/inoculum tank 50 to each injection needle 58 (described further below), a fluid/inoculum propellant apparatus 62 (see FIG. 1) (e.g., a pump, an air compressor, etc.) for generating a flow of fluid/inoculum from the fluid/inoculum tank 50 to the needle(s) 58, via the flow tubes 54, as controlled by the system controller 20. Although the system 10, as described herein, can be utilized to collect any desired data and/or samples from the one or more row of plants and/or the planting area/environment, apply any treatment to the one or more row of plants and/or the planning area/environment (e.g., inject any desired fluid into the stems 34), or perform any other desired operation/analysis to/from the plants and/or the planting area/environment, the system 10 will be exemplarily described herein as an inoculation system 10 and the fluid injected will be referred to as inoculum.

In various embodiments, the assembly 14 can include a fender or brush guard 66 that is mount to and extends forward of the carrier beam 46. The fender/brush guard 66 is structured and operable to protect the front of the mobile platform 12 and assembly 14 from damage by such things as weeds, crop debris, etc., that may come into contact mobile platform 12 and/or assembly 14 during operation of the system 10. Additionally, in various embodiments, the fender/brush guard 66 can assist in keeping the system 10 substantially centered between the rows of stems 34 as the system 10 moves forward between the rows of stems 34. The fender/brush guard 66 can be fabricated of any material and have any size, shape, construction or configuration suitable to perform the tasks described above.

As used herein, the word "front" or "forward" and the phase "forward of" are used to describe the direction from a named component or structure toward the front of the mobile platform 12. For example, the statement that the carrier beam 46 is mounted to the "front" portion of the chassis 22 means the carrier beam 46 is mounted to the chassis 22 at an area is the leading edge or leading portion of the chassis 22 as the mobile platform 12 (i.e., the system 10) moves in a forward direction between the stems 34. Similarly, as used herein, the word "rear" or "rearward" and the phase "rearward of" are used to describe the direction from a named component or structure toward the rear of the mobile platform 12. For example, the statement that each stem inoculation mechanism 18 extends "rearward" from the carrier beam 43 means that each mechanism 18 extends from the carrier beam 42 toward a trailing edge or trailing portion of the chassis 22 as the mobile platform (i.e., the system 10) moves in a forward direction between the stems 34.

Referring now to FIGS. 3, 4, 5, 6 and 7, as described above, the stem inoculation system 10 can include one or more stem inoculation assemblies 14, and each stem inoculation assembly 14 can include one or more stem inoculation mechanism 18. FIGS. 1 and 2 exemplarily show the system 10 including a single assembly 14, but it is envisioned that the system 10 can include one or more additional assembly 14 mounted to the mobile platform chassis rearward from the assembly 14 exemplarily shown, and/or one or more additional assembly 14 mounted to additional bracing, framework, etc., forward of the assembly 14 exemplarily shown, and remain within the scope of the present disclosure. Furthermore, a mobile platform comprising multiple additional assemblies 14 supported to, and/or extending from, the sides of the mobile platform are also envisioned, such that the system 10 can inoculate multiple rows of plants in a single pass through or over an area where crops are grown. Accordingly, the system 10 can include one or more additional inoculation mechanisms than is/are exemplarily shown and remain within the scope of the present disclosure. Additionally, although the mobile platform 12 is exemplarily shown in FIGS. 1 and 2 as a walk behind style mobile platform, it is envisioned that the mobile platform 12 can be a larger vehicle suitable for traversing the field while operably disposing one or more mechanisms 18 between two or more rows of plants/stem 34 to inoculate the plants in the two or more rows as described herein, and remain within the scope of the present disclosure.

Each stem inoculation mechanism 18 generally comprises a guiderail 70 that is pivotally connected to the carrier beam 46 at a proximal end 70A, a linkage assembly 74 mounted to a backside of the guiderail 70, an injection assembly 78 mounted to a transition member 82 of the linkage assembly 74, and a centering assembly 86 mounted to a fixed member 90 of the linkage assembly 74. Alternatively, the centering assembly 86 can be mounted to the backside of the guiderail 70. The guiderail 70 is pivotally connected to the carrier beam 46 at the proximal end 70A such that an opposing distal end 70B of the guiderail 70 can move toward and away from the mobile platform 12 in the $X^+$ and the $X^-$ directions, as described below. Moreover, since the fixed member 90 of the linkage assembly 74 is mounted to the back side of the guiderail 70 and the injection assembly 82 and centering assembly 86 are mounted to the linkage assembly 74, the linkage assembly 74, injection assembly 82 and centering assembly 86 will move toward and away from the mobile platform 12 in the $X^+$ and the $X^-$ directions in accordance with the movement of the guiderail distal end 70B toward and away from the mobile platform 12 in the $X^+$ and the $X^-$ directions. Importantly, the guiderail distal end 70B, and hence the linkage assembly 74, injection assembly 82 and centering assembly 86, is/are biased away from the mobile platform 12 in the $X^+$ direction, via a biasing device 94. The biasing device 94 can be mounted within the inoculation assembly 14 in any manner suitable to exert a biasing force in the $X^+$ direction on the any one or more of the guiderail distal end 70B, linkage assembly 74, injection assembly 82 and/or centering assembly 86. Additionally, the biasing device 94 can be any suitable biasing device, e.g., a spring, pneumatic or hydraulic actuator/piston, etc., that is structured and operable to exert a biasing force in the $X^+$ direction on the any one or more of the guiderail distal end 70B, linkage assembly 74, injection assembly 82 and/or centering assembly 86 such that in a Home or static position the distal end 70B of the guiderail 70 is located as far away from the mobile platform in the $X^+$ direction as the limits of the biasing device, and/or structure of the inoculation assembly 14 allow.

In various embodiments, wherein each inoculation assembly 14 comprises a pair of inoculation mechanisms 18 (as exemplarily shown in FIGS. 1, 2 and 3), the distal ends 70B of the respective guiderails 70 define a wingspan W that can be wider than the distance between opposing rows of stems 34, which allows the system 10 to remain substantially centered between opposing rows of stems and improves inoculation success of stems that are not exactly aligned with the other plants in their respective rows and/or stems that are bent and/or twisted. Accordingly, in such embodiments, when the inoculation system 10 moves between the rows, each stem 34 in each row will sequentially contact the respective guiderail 70 and push the respective guiderail 70 inward in the $X^-$ direction against the resistive force of the respective biasing device 94, as described further below. Alternatively, in various embodiments wherein each inoculation assembly 14 comprises a single inoculation mechanism 18 disposed along only one side of the mobile platform 12, the inoculation system 10 must be guided or driven in close enough proximity to a row of stems 34 such that as the system 10 moves along, adjacent the respective row, each stem 34 in the respective row will sequentially contact the respective guiderail 70 and push the respective guiderail 70 inward in the $X^-$ direction against the resistive force of the respective biasing device 94. Hence, each biasing device 94 is structured and operable to allow the guiderail distal end 70B, linkage assembly 74, injection assembly 82 and centering assembly 86 to be moved inward in the $X^-$ direction toward the mobile platform 12 as the guiderail 70 contacts a stem 34 as the inoculation system 10 moves forward along the ground surface adjacent at least one row of stems 34 (e.g., between two rows of stems 34). Subsequently, once a stem 34 slides past the distal end 70B of the guiderail 70, the biasing device 94 will return the guiderail distal end 70B, linkage assembly 74, injection assembly 82 and centering assembly 86 to the Home position.

In various embodiments, the linkage assembly 74 comprises the fixed member 90 that is fixedly mounted to the guiderail 70, the transition member 82, and a plurality of pivot arms 98 that movably connect the transition member 82 to the fixed member 90 such that the transition member 82 can move back and forth, relative to the guiderail 70 and fixed member 90 in the $Z^+$ and $Z^-$ directions, and in and out in the $X^+$ and $X^-$ directions. Note that the $Z^+$ direction is substantially the direction the inoculation system moves when advanced forward adjacent, e.g., between, the rows of stems 34. More particularly, each pivot arm 98 is substantially the same length and is pivotally connected at a first end 98A to the fixed member 90 and pivotally connected at a second end 98B to the transition member 82. Accordingly, since each pivot arm 98 is substantially the same length, the transition member 82 is oriented substantially parallel to the fixed member 90 and will move back and forth along in the $Z^+$ and $Z^-$ directions substantially parallel with the fixed member 90 and the direction of travel of the inoculation system 10 along the respective row(s) of plants 34. Each respective inoculation mechanism 18 includes a linkage biasing device 102, e.g., a spring, pneumatic actuator, hydraulic actuator, resilient band or belt, etc. The linkage biasing device 102 is structured and operable to apply a resistive and resilient force on the transition member 82 to retain the transition member 82 in a Set position (show best in FIG. 6). The Set position will be understood to be the position wherein the transition member 82 is moved as far in the $Z^+$ direction as the structural limits of the linkage assembly 74 allow.

As described further below, when the injection assembly 78 is operated to inject a given stem 34 with the inoculum, the needle 58 will be inserted into the respective stem 34 and remain within the respective stem 34 for a brief period of time, e.g., 0.25-0.75 seconds, while the inoculum is injected into the respective stem. It is envisioned that during this time the inoculation system 10 will continue to advance along the row of stems 34 without stopping. Therefore, in order to prevent, the needle 58 from being pried, pushed or pulled laterally, or sideways, within the respective stem 34 and thereby ripping, tearing or otherwise damaging the stem 34 as the inoculation system 10 continues to advance, the transition member 82 will be moved in the $Z^-$ direction so that the needle 58 remains in substantially the same orientation within the stem 34 throughout the injection process. More specifically, when a respective stem 34 is determined to be within a strike zone SZ by the centering assembly 86 (as described below), the injection assembly 78 will insert the needle 58 into the respective stem 34 (as described below) while the inoculation system 10 continues to advance along the row. Advancement of the inoculation system 10 while the needle 58 is inserted into the stem 34 will cause the respective stem 34 to exert a force (e.g., a lateral force in the $Z^-$ direction) on the needle 58, and reactively the needle 58 will exert an equal and opposite force (e.g., a lateral force in the $Z^+$ direction) on the stem 34.

However, since the needle 58, i.e., the injection assembly 78, is connected to the transition member 82 of the linkage assembly 74, the force in the $Z^-$ direction will overcome the force exerted on the transition member 82 in the $Z^+$ direction by the linkage biasing device 102. Consequently, the transition member 82 will be pulled in the $Z^-$ direction from the Set position and transitioned (relative to the guiderail 70) to an Extraction position such that injection assembly 78, particularly the needle 58, will temporarily stop advancing/moving in the $Z^+$ direction (relative to the ground and the respective stem being injected) with the advancement of the inoculation system 10. That is, the injection assembly 78, needle 58 and respective stem 34 will move substantially in unison relative to the guiderail 70, and remain substantially stationary relative to the ground and stem 34, as the inoculation system 10 moves along the ground surface 38 adjacent the respective stem 34. Accordingly, the needle 58 will be injected straight into the stem 58 and be extracted or withdrawn straight out of the stem 58. That is, the needle 58 will follow substantially the same path or line while being extracted from the stem 34 as it did while being inserted into the stem 34, thereby preventing ripping or tearing of stem by the needle 58. As will be understood by the description above, the linkage biasing device 102 is structured and operable to apply a force to the transition member 82 that is sufficient to return and maintain the transition member in the Set position while the injection assembly 78 is not operating to inject a respective stem 34, but is easily overcome by the force applied to the needle 58 and injection assembly 78 in the $Z^-$ direction while the needle is inserted into the respective stem 34. It should be noted that as the transition member 82 moves backwards in the $Z^-$ direction in relation to the guiderail 70 during inoculation, the transition member 82, and hence the injection assembly 78 and needle 58, also moves slightly inward in the $X^-$ direction, thereby helping break stiction between the needle 58 and stem 34, as well as allowing inoculum to fill the small cavity in the stem 34 created by the needle 34.

Said another way, since the needle 58 and/or, i.e., the injection assembly 78, is/are connected to the transition member 82 of the linkage assembly 74, the force in the $Z^-$ direction will overcome the force exerted on the transition member 82 in the $Z^+$ direction by the linkage biasing device 102. Consequently, the needle 58 that is inserted in the stem will act to temporarily anchor the position of the injection assembly 78 and transition member 82 relative to stem 34 and ground surface as the mobile platform 12 advances in the $Z^+$ direction. That is, the injection assembly 78, the needle 58 and respective stem 34 will maintain substantially fixed positions relative to one another for a period of time necessary to complete the injection of the respective stem 34 as mobile platform 12 and guiderail 70 slides past the respective stem. Accordingly, the needle 58 will be pointed toward the center of the stem when it penetrates straight into the stem 34 and will be extracted from the stem 34 along substantially the same path. That is, the centering assembly 86 can serve to ensure that the needle 58 will follow substantially the same path or line while being extracted from the stem 34 as it did while being inserted into the stem 34, thereby preventing ripping or tearing of the stem by the needle 34 as the mobile platform 12 progresses uninterrupted alongside the stem 34. As will be understood by the description above, the linkage biasing device 102 can be structured and operable to apply a force to the transition member 82 that is sufficient to return and maintain the transition member 82 in the Set position while the injection assembly 78 is not operating to inject a respective stem 34. The amount of force applied by the linkage biasing device 102 can be calibrated such that it is easily overcome when the needle 58 is anchored in a respective stem 34 during injection, but will not be overcome by other plant parts (e.g. leaves, corn tassels, etc.) or plant debris in the growing area.

As described above, the injection assembly 78 is mounted to the transition member 82 and is structured and operable to inject each stem 34 with the inoculum as each stem 34 passes through the strike zone SZ (shown in FIGS. 3, 4 and 6) of the inoculation mechanism 18 as the mobile platform 12 (i.e., the inoculation system 10) moves along the ground surface adjacent each plant stem 34. The strike zone SZ is defined as the area (or zone) along an outside face 70C of the guiderail 70 that substantially begins at a point on the face 70C of the guiderail 70 where a respective stem 34, as it slides along the face 70C of the guiderail 70, is determined by the centering assembly 86 to be substantially centered in front of the needle 58 (relative to the direction of travel of the needle 58) and ends at the point on the face 70C of the guiderail 70 where the needle 58 is completely withdrawn from the respective stem 34. Hence, the strike zone SZ is the area or zone along the face 70C of the guiderail 70 in which each stem 34 is injected with the inoculum as the inoculation system 10 advances along the row. The length of the strike zone SZ can vary depending on the rate of advancement, i.e., the speed, of the inoculation system 10 along the row, and the inoculation volume as selected by the operator or recipe. That is, in various embodiments, the faster the inoculation system 10 is advancing, the longer the strike zone SZ will be. Similarly, the larger volume of inoculum to be delivered, and hence the longer the duration of the needle 58 within the stem 34, the longer the strike zone. However, since the linkage assembly 74 and biasing device 94 always returns the injection system 78, and more particularly the needle 58, to the Set position, during operation of the inoculation system 10 the beginning of the strike zone SZ is substantially a fixed point on the face 70C of the guiderail 70. That being said, it should be noted that the location of where the linkage assembly 78 is mounted to the back of the guiderail 70, and/or the configuration of the linkage assembly 78, can be adjustable such that the beginning of the strike zone SZ can be adjusted or calibrated prior to operation of the inoculation system 10.

It is envisioned that in various embodiments, calibration of the length of the strike zone SZ can be implemented via the system controller 20 and an associated user interface, by increasing or decreasing the time between sensing a stem 34 has entered the strike zone SZ (as described below) and output of a signal to extend the needle 58 (as described below). Accordingly, the accuracy of injection can be fine-tuned. Additionally, it is envisioned that in various embodiments, further adjustments to the strike zone calibration can be based on a speed setting of the mobile platform 12.

The injection assembly 78 can comprise any apparatus, device, or mechanism that is structured and operable to controllably move the needle 58 outward in the $Y^+$ direction to insert the needle 58 into each stem 34, and retract the needle 58 back inward in the in the $Y^-$ direction to remove the needle 58 from each stem 34. For example, the injection assembly 78 can be an electronic actuator or piston, a pneumatic actuator or piston, or a hydraulic actuator or piston that is operable to controllably extend and retract the needle 58. For example, as exemplarily illustrated in the various figures, the injection assembly 78 can comprise a pneumatic actuator 106 that is mounted to an end of the transition member 82. In various implementations, the pressure supplied to the pneumatic actuator 106 (e.g., the pneumatic pressure supplied) can be adjustable such that the pressure used to extend the needle 58 and insert the needle 58 into each respective stem 34 can be set to any desired pressure, e.g., 50 to 120 psi.

The actuator 106 is operable, as controlled by the system controller 20 or other controller such as a programmable logic controller (PLC), to controllably extend and retract one or more shafts 110. In such embodiments, the injection assembly 78 additionally includes a needle head 114 connected to the shaft(s) 110 and to which the needle 58 can be removably connected. The needle 58 can comprise any sized and shaped needle suitable to penetrate each stem 34 and inject the inoculum therein. Moreover the needle 58 and needle head 114 can be structured such that various different types, sizes and shapes of needle can be connected to the needle head 114 and use with the inoculation system 10. As described above, in various implementations, the operation of the actuator 106 can be controlled by the system controller 20 that is communicatively connected to the actuator 106 and the centering assembly 86. Or, in various other embodiments, the operation of the actuator 106 can be controlled by a peripheral controller, control device, or electronic circuit (e.g., a PLC, ASIC, etc.) that is communicatively connected to the actuator 106 and the centering assembly 86, and in various implementations, also connected to the system controller 20.

In operation, as each respective stem 34 contacts the guiderail 70 and slides along the face 70C thereof as the inoculation system 10 advances along the row, the centering assembly 86 determines (e.g., electrically or optically senses, or mechanically determines) when each respective stem 34 enters the strike zone SZ and communicates with (e.g., sends a signal to) the actuator controller (e.g., the system controller 20, and/or other controller, control device, or electronic circuit) that a stem has entered the strike zone SZ. Upon receipt of the communication indicating a stem 34 has entered the strike zone SZ, i.e., the stem 34 is substantially centered in front of the needle 58, the actuator controller instructs/commands/operates the actuator 106 to extend the needle head 114 and needle 58, whereby the needle is inserted into the respective stem 34. The needle 58 is fluidly connected with the inoculum tank 50 via the flow tubes 54. Subsequent to, or substantially simultaneously with, insertion of the needle 58 into the respective stem 34 the system controller 20 controls operation of the inoculum propellant apparatus 62 to dispense inoculum from the needle 58, via the inoculum tank 50 and flow tubes 54, thereby injecting the respective stem 34 with the inoculum. Thereafter, the actuator 106 is operated to retract the needle head 114 and needle 58 to remove the needle 58 from the respective stem 34. As described above, upon insertion of the needle 58 into each respective stem 34 the transition member 82 of the linkage assembly is moved in the $Z^-$ direction, via force applied on the needle and injection assembly 78 resulting from the needle 58 being inserted into a stem 34 as the inoculation system 10 continues to advance along the row.

The transition or movement of the transition member 82 in the $Z^-$ direction momentarily (i.e., for a short period of time, e.g., 0.25-0.50 seconds) prevents the needle 58 and injection assembly 78 from moving in the $Z^+$ and $Z^-$ directions such that the needle 58 and stem 34 are not moving laterally (i.e., in the $Z^+$ and $Z^-$ directions) relative to each other while the respective stem 34 is within the strike zone, thereby preventing damage to the stem 34. In various embodiments (as exemplarily illustrated FIG. 4), the guiderail 70 includes a slot aperture 118 through which the needle 58 can be extended upon activation of the actuator 106 to insert the needle 58 into each stem 34 as each stem 34 enters and passes through the strike zone SZ. The slot aperture 118 has a length that is longer than the strike zone SZ so the that the guiderail 70 can continue to move in the $Z^+$ direction, while the transition member 82 moves in the $Z^-$ direction, such that the respective stem 34 and needle 58 do not move laterally relative to each other during insertion and retraction of the needle 58, as the inoculation system continues to move along the row in the $Z^+$ direction.

As described above, the centering assembly 86 is mounted to the linkage assembly fixed member 90 and/or the guiderail 70 and is structured and operable to determine when each stem in the row is within the strike zone. The centering assembly 86 can be any assembly structured and operable to determine when each stem in the row is within the strike zone, particularly, when a center of a respective stem 34 is substantially centered in front of the needle 58. For example, the centering assembly can be an optical based assembly, an image based assembly, laser based assembly, an electromagnet based assembly, a GPS based assembly, an electromechanical based assembly, etc. In various embodiments, as exemplarily illustrated throughout the various figures, the centering assembly 86 can comprise a centering sensor 122, exemplarily illustrated and described in FIGS. 1-10B as a star shaped wheel 122, that is rotationally mounted to a hub 126 that is connected to the linkage assembly fixed member 90 and/or the guiderail 70. With reference to FIGS. 1-10B, the star shaped wheel centering sensor 122 will generally be referred to herein as the star wheel 122.

The star shaped wheel comprises a plurality of arms 130 that are shaped and sized to form a plurality of stem receptacles, or valleys, 134 (also referred to herein as stem receptacles) between each adjacent set of arms 130. The valleys 134 are sized and shaped to accommodate and momentarily cradle each stem 34 between the adjacent arms 130 as the inoculation system 10 advances along the row. Moreover, the star wheel 122 is rotationally mounted to the hub 126 and hub 126 is connected to the fixed member 90 and/or the guiderail 70, such that at any given time or point in the rotation of the star wheel 122, at least a portion of one arm 130 will extend beyond the face 70C of the guiderail 70. More specifically, at any given time or point in the rotation of the star wheel 122 at least a portion of one arm 130 will be extended beyond the face 70C of the guiderail 70 into the path of each stem 34 as each stem 34 slides along the face 70C of the guiderail 70 as the inoculation system 10 advances along the respective row of stems 34. In various embodiments, the guiderail 70 includes a wheel aperture 138 through which the arms 130 of the star wheel 122 will extend beyond the face 70C of the guiderail 70 into the path of each stem 34.

In operation, as the inoculation system 10 advances along a row (e.g., between a pair of rows) and a respective stem 34 contacts the face 70C of the guiderail 70, the stem 34 will slide along the guiderail 70 in the Z⁻ direction pushing the guiderail 70 inward in the X⁻ direction. As the inoculation system 10 continues to advance, the stem 34 will contact a leading face (or edge) 130A of a respective arm 130 of the star wheel 122 that is extending beyond the face 70C of the guiderail 70 causing the star wheel 122 to rotate. As the inoculation system 10 continues to advance, the respective stem 34 will continue to slide along the face 70C of the guiderail 70 in the Z⁻ direction pushing on the leading face 130A of the respective star wheel arm 130 causing the star wheel 122 to further rotate. Consequently, a trailing face (or edge) 130B of an adjacent star wheel arm 130 (i.e., the next star wheel arm 130 relative to the rotation of the star wheel 122) will contact the stem 34 such that stem 34 is simultaneously in contact with adjacent star wheel arms 130 and positioned within the valley 134 between the two respective star wheel arms 130. Importantly, the star wheel 122 is mounted and located such that when a stem 34 is simultaneously in contact with adjacent star wheel arms 130 and positioned within the valley 134 between two respective star wheel arms 130, the respective stem 34 is within the strike zone SZ.

The centering assembly 86 of the inoculation mechanism 18 further includes a strike zone sensor 142 that is communicatively connected to the actuator controller (e.g., the system controller 20, and/or other controller, control device, or electronic circuit). The strike zone sensor 142 is structured and operable to determine when the star wheel 122 is rotated to a position wherein a stem 34 is substantially centered in a known position, just ahead, in the Z⁺ direction, of the point at which the actuator 106 will insert the needle 58 into the stem 34. The strike zone sensor 142 can be any type of sensor suitable for sensing when the star wheel 122 is rotationally positioned such that a stem 34 is located within a valley 134 of the star wheel 12 simultaneously in contact with adjacent star wheel arms 130 and located in a known position just before being substantially centered in front of the needle 58. For example, the strike zone sensor 142 can be an optical based sensor, an image based sensor, laser based sensor, an electromagnet based sensor, a GPS based sensor, an electromechanical based sensor, etc. In various embodiments, the strike zone sensor 142 detects the center axis of the stem rather than the leading edge.

In various embodiments, the star wheel 122 comprises a plurality of metallic sensor pins 146 disposed within the star wheel arms 130, and the strike zone sensor 142 is an inductive proximity pin sensor that is structured and operable to sense when a sensor pin 146 passes the strike zone sensor 142 as the star wheel 122 rotates. Each sensor pin 146 is located within a respective one of the star wheel arms 130 and the strike zone sensor 142 is disposed within the centering assembly 86 such that each time a valley 134 is located just before being substantially centered in front of the needle 58, e.g., each time a stem 34 is located in a set position just prior to being substantially centered in front of the needle 58, a sensor pin 146 disposed in a corresponding arm 130 is substantially aligned with, or in very near proximity to (e.g., 0.05 inches), the strike zone sensor 142. Each time the strike zone sensor 142 senses substantial alignment with a sensor pin 146 the strike zone sensor 142 sends a strike signal to (or otherwise communicates with) the actuator controller (e.g., the system controller 20, and/or other controller, control device, or electronic circuit) indicating that a valley 134, e.g., a stem 34, is in the set position just prior to being substantially centered in front of the needle 58. Upon receipt of the strike signal, the actuator controller triggers, energizes or activates the actuator 106, whereafter the actuator 106 extends the needle head 114 inserting the needle 58 into the respective stem 34. In various embodiments, prior to activating the actuator 106, the system controller 20 can run an offset timer to slightly delay activation of the actuator 106.

In various embodiments, the center assembly 86 can include a stem verification system, apparatus or device (not shown) that is structured and operable to verify that a stem 34 is present within the corresponding valley 134 when a sensor pin 146 substantially aligns with, or is in very close proximity to, the strike zone sensor 142. In such instances, if the stem verification system determines that a stem 34 is not present, the actuator controller will not trigger, energize or activate the actuator 106. Alternatively, in various embodiments, the injection assembly 78 can include a tensioner 150 (FIG. 7), e.g., a torsion spring, operably connected to the star wheel 122 that is structured and operable to apply a controlled amount of resistance to the rotation of the star wheel 122 such that leaves and debris do not cause the star wheel to turn and activated the injection assembly actuator 106. Hence, the tensioner 150 applies a force to the star wheel 122 sufficient to prevent inadvertent rotation of the star wheel 122 by miscellaneous things such as leaves or debris, but can be overcome by the force applied to the star wheel 122 by a stem sliding along the face 70C of the guiderail 70, as described above.

Figure 10A:
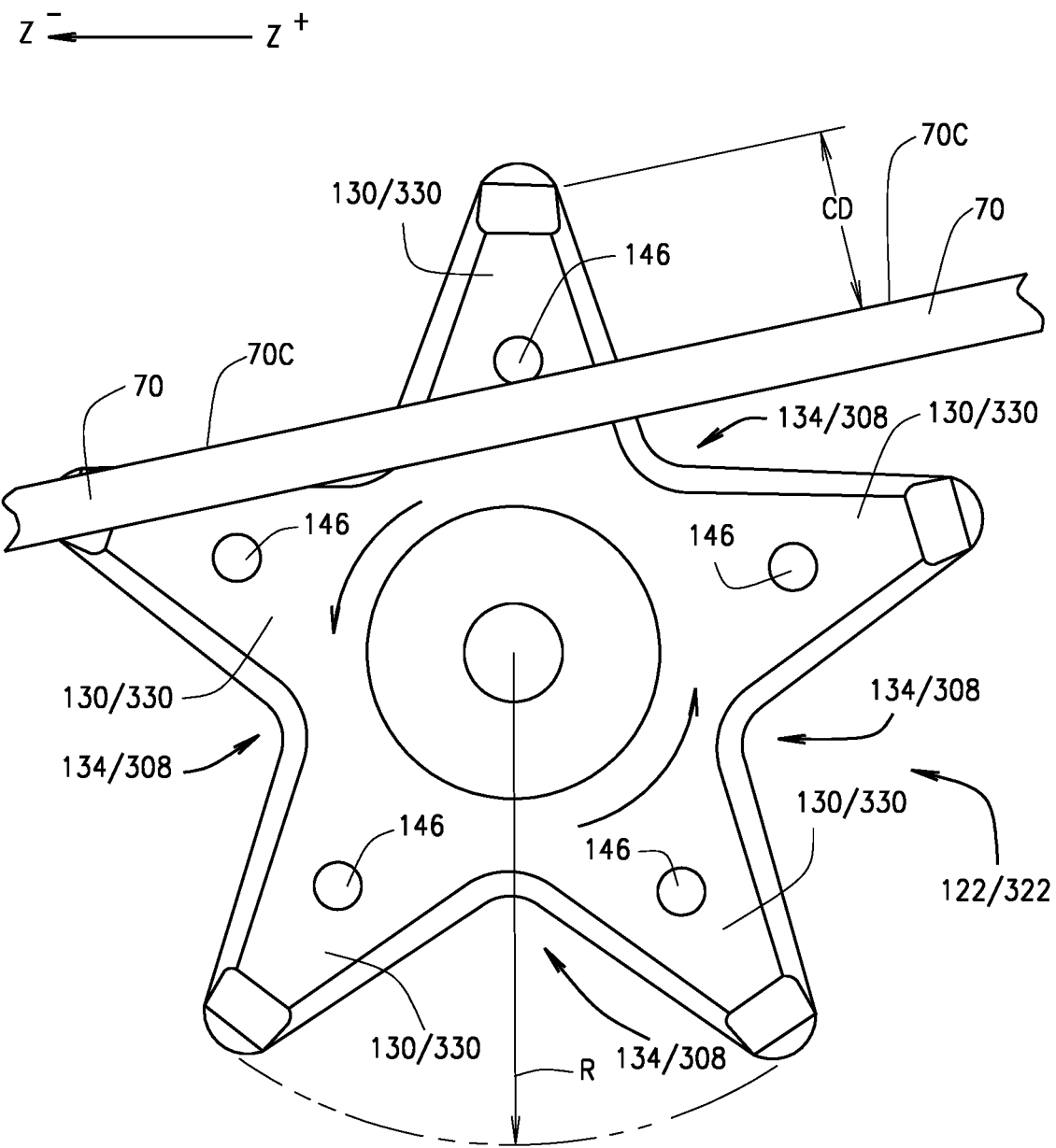
FIG. 10A is a schematic top view of a star wheel of the stem inoculation system shown in FIG. 1, in accordance with various embodiments of the present disclosure.
Figure 10B:
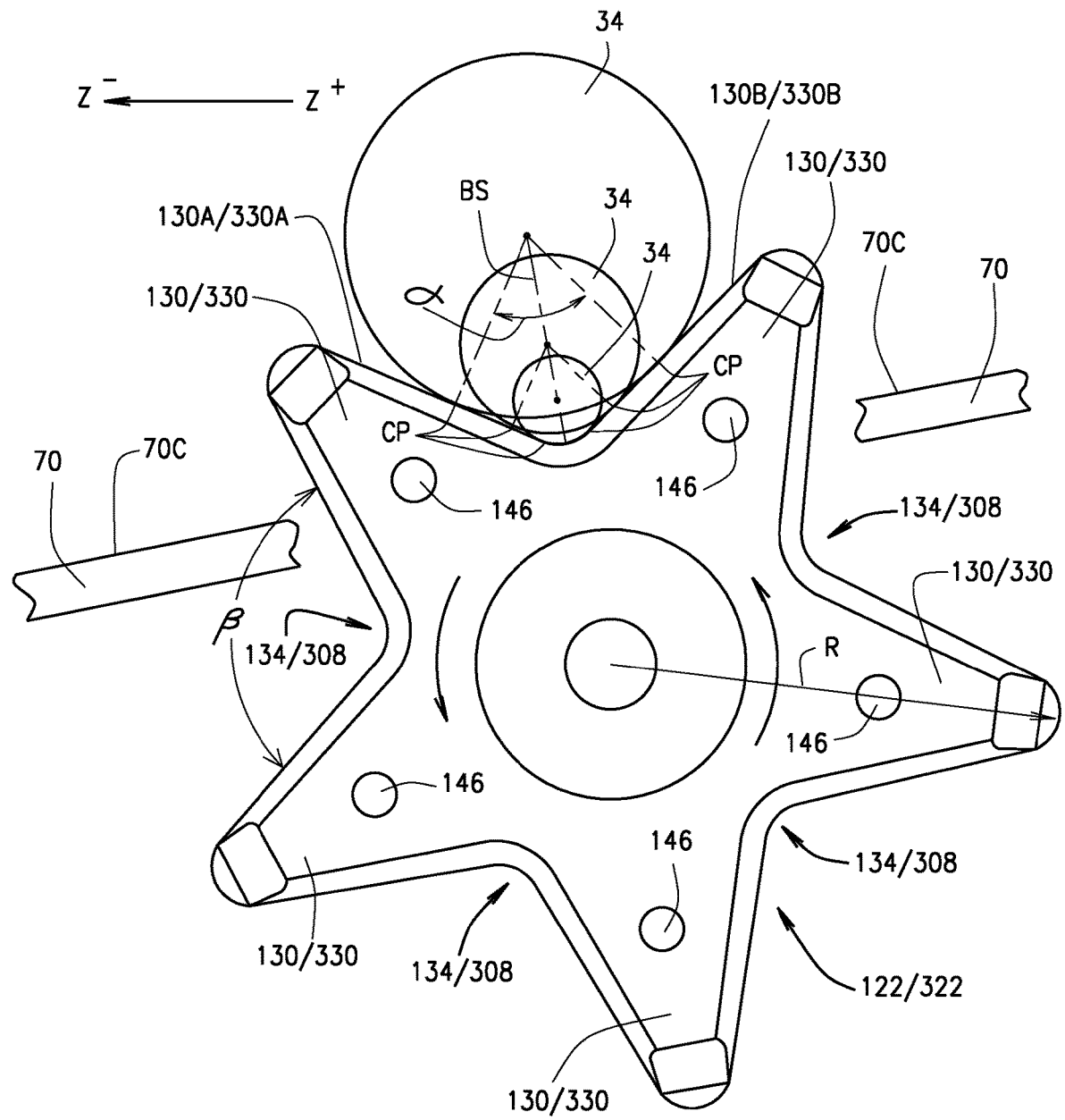
FIG. 10B is a schematic top view of the star wheel of the stem inoculation system shown in FIG. 1 having a plurality of different size diameter stems engaged therewith, in accordance with various embodiments of the present disclosure.

Referring now to FIGS. 10A and 10B, FIG. 10B exemplarily illustrates a plurality of stems 34 of varying size (e.g., varying diameters of stems) disposed between adjacent arms 130 such that the respective stem 34 is positioned for injection/inoculation. As described above, the star wheel 122 comprises a plurality of arms 130 that are shaped and sized to form a plurality of valleys 134 between each adjacent set of arms 130, wherein the valleys 134 are sized and shaped to accommodate and momentarily cradle each stem 34 between the adjacent arms 130 as the inoculation system 10 advances along the row. Moreover, the star wheel 122 is structured to have a radius R selected so that each arm 130 will extend beyond the outside face 70 of the guiderail 70 a catch distance CD sufficient to 'catch' a respective stem 34, whereby the respective stem 34 will rotate the star wheel 122 and properly activate the injection assembly actuator 106 and inject/inoculate the respective stem 34, as described herein. That is, the star wheel 122 is designed so that the arms 130 have a length such that, as each arm 130 is sequentially rotated to extend beyond the guiderail face 70C to contact a subsequent stem 34 (as described above), a portion of the respective arm 130 extends beyond the guiderail face 70C the catch distance CD that is sufficiently long to prevent any stem 34, regardless of the stem size (e.g., diameter of stem), from sliding off, or bouncing over, the end of the respective arm 130 and not activating the actuator 106, whereby the respective stem would be bypassed and not get injected/inoculated. For example, in various implementations, the radius R of the star wheel 122 can be between 2.00 and 4.00 inches, and the catch distance CD can be between 0.75 and 2.50 inches. Hence, a larger the radius R provides a larger catch distance CD, thereby decreasing the chance a stem 34 being bypassed and not being injected/inoculated.

Additionally, the star wheel 122 is structured to have a number of arms 130 selected to provide valleys 134 having a vertex angle β between the contact edges of adjacent arms 130 (e.g., between the leading edge 130A of a first arm 130 and the trailing edge 130B of an adjacent second arm 130) that is designed and sized to stably and accurately position each respective stem 34 within the strike zone SZ such that the respective stem 34 is substantially centered in front of the needle 58, regardless of the stem size (e.g., regardless of the diameter of stem 34). More particularly, the star wheel 122 is designed to have a particular number of arms 130 and a vertex angle β therebetween such that one of the sensor pins 146 will substantially align with the strike zone sensor 142 slightly before (e.g., 0.10-0.50 seconds before) or substantially simultaneously with each time a stem 34 is substantially centered with the needle 58. That is, two adjacent arms 130 will contact each stem 34 as one of the sensor pins 146 passes the strike zone sensor 142. In this way, the position of the center of each stem 34, regardless of stem size, will align with a bisector BS of the respective two arms 130, e.g., be substantially centered in front of the needle 58 substantially simultaneously with, or slightly after (e.g., 0.10-0.50 seconds after) the actuator 106 is activated, via alignment of a sensor pin 146 with the strike zone sensor 142.

Hence, the star wheel 122 comprises a number of arms 130 and a vertex angle β therebetween designed to timely activate the actuator 106 such that each stem 34 will be injected/inoculated as the center of each respective stem 34 is substantially centered in front of the needle 58. Therefore, each stem 34 will be injected/inoculated substantially in the center of the respective stem 34, thereby providing consistent test conditions that will result in more accurate test data. Accordingly, the star wheel 122 can be designed to have any desired number of arms 130 having any desired vertex angle β therebetween such that the star wheel 122 provides a desired level of accuracy of aligning the center of each stem 34 with the needle 58 as the needle 58 is advanced into the respective stem 34. For example, in various embodiments, for accurately centered injection/inoculation of stems 34 ranging between 0.5 and 2.0 inches in diameter, the star wheel 122 can comprise five arms 130 having a vertex angle β of approximately 110° therebetween. It should be noted that the greater the vertex angle β is (e.g., the more obtuse the vertex angle β is) the lessor, or narrower, an angle α (e.g., the more acute the angle α) will be between the contact points CP of the respective stem and the arms 130 (e.g., the points where the respective stem 34 contacts the adjacent arms 130). Conversely, the lessor, or narrower, the vertex angle β is (e.g., the more acute the vertex angle β is) the greater the angle α (e.g., the more obtuse the angle α) will be between the contact points CP of the respective stem and the arms 130.

Furthermore, in various embodiments, the star wheel 122 is designed to have a desired number of arms 130 and a vertex angle β therebetween such that: 1) when a first arm 130 extends beyond the guiderail face 70C and is positioned to receive/contact an oncoming stem 34, the subsequent or trailing arm 130, (relative to the direction of rotation of the star wheel 122) is located behind guiderail face 70C out of the path of the respective stem 34; and 2) after the respective stem 34 has been inoculated the trailing arm 130 is now positioned to receive/contact a subsequent oncoming stem 34, and the next subsequent or trailing arm 130, (relative to the direction of rotation of the star wheel 122) is located behind guiderail face 70C out of the path of the respective stem 34.

Figure 8:
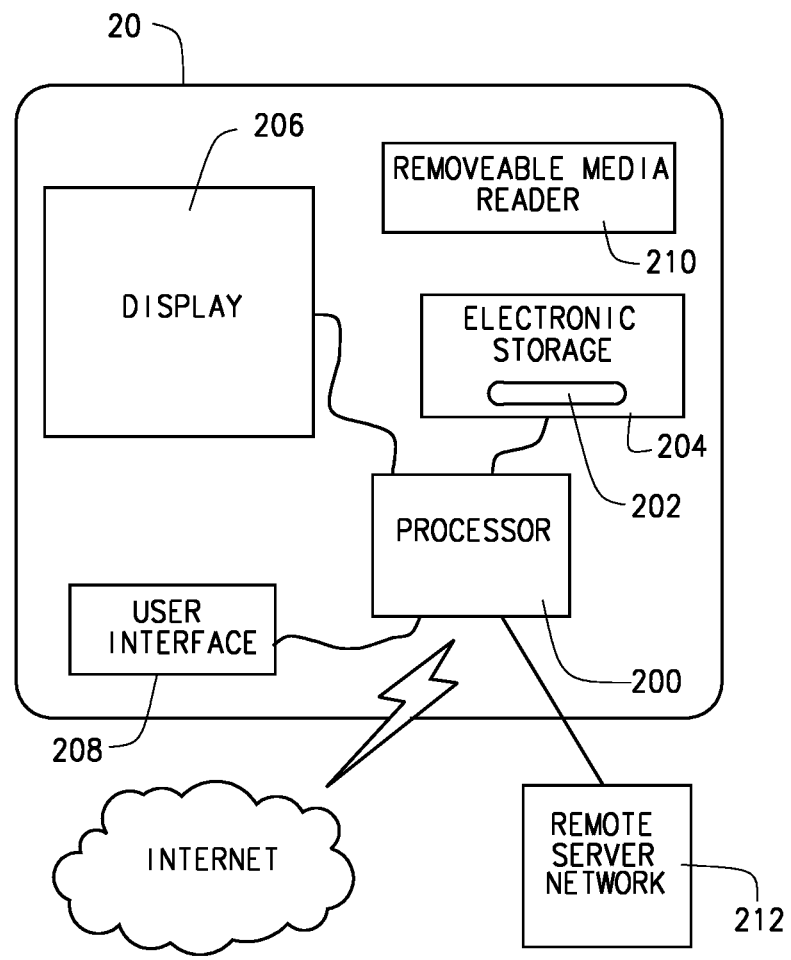
FIG. 8 is a block diagram of a control system of the stem inoculation system shown in FIG. 1, in accordance with various embodiments of the present disclosure.

Referring now to FIG. 8, as described above, the system controller 20 is structured and operable to control one or more automated operations of the inoculation system 10 and/or other systems designed to sense or treat some aspect of a plant (sensing/treatment) systems) described herein. For example, in various embodiments, the controller 20 can entirely control or control in part, via communication with other control devices of the inoculation system 10 and/or other sensing/treatment systems described herein, the automated operations of the injection assembly 78 and/or the centering assembly 86. More particularly, the system controller 20 is a computer based system that includes one or more computers, controllers, programmable circuitry, electrical modules, etc. that can be located at various locations of the inoculation system 10 and/or other sensing/treatment systems described herein. In various embodiments, the system controller 20 comprises one or more processor 200 structured and operable to execute one or more system software, programs, algorithms, and/or code (referred to herein simply as system software 202), whereby operations of the injection assembly 78 and/or the centering assembly 86, and various other features, functions, systems, devices, assemblies, etc., of the inoculation system 10 and/or other sensing/treatment systems described herein can be controlled.

In various implementations, the system controller 20 additionally includes at least one electronic storage device 204 that comprises a computer readable medium, e.g., non-transitory, tangible, computer readable medium, such as a hard drive, erasable programmable read-only memory (EPROM), electronically erasable programmable read-only memory (EEPROM), read-write memory (RWM), etc. Other, non-limiting examples of the non-transitory, tangible, computer readable medium are nonvolatile memory, magnetic storage, and optical storage. Generally, the computer readable memory can be any electronic data storage device for storing such things as the various software, programs, algorithms, code, digital information, data, look-up tables, spreadsheets and/or databases, etc., used and executed during operation inoculation system 10 and/or other sensing/treatment systems described herein. Furthermore, in various implementations, the system controller 20 can include at least one display 206 for displaying such things as information, data and/or graphical representations, and at least one user interface device 208 such as a keyboard, mouse, stylus, and/or an interactive touch-screen on the display 206. The user interface 208 is structured and operable to allow a user of the inoculation system 10 and/or other sensing/treatment systems described herein input control data and information and retrieve operation status data and information regarding the operation of the inoculation system 10 and/or other sensing/treatment systems described herein. For example, in various embodiments, the user interface 208 can be used to set system parameters such as calibration offsets, and to perform logging of activities (e.g., missed stems, stand count, etc.).

In various implementations, the system controller 20, or at least the user interface 200, is disposed on the inoculation system 10 and/or other sensing/treatment systems described herein a location conveniently accessible to the user, e.g., near a steering control of the inoculation system 10 and/or other sensing/treatment systems described herein (e.g., one or more steering handles).

Still further, in various implementations, the system controller 20 can include a removable media reader 210 for reading information and data from and/or writing information and data to removable electronic storage media such as floppy disks, compact disks, DVD disks, zip disks, flash drives or any other computer readable removable and portable electronic storage media. In various embodiments the removable media reader 210 can be an I/O port utilized to read external or peripheral memory devices such as flash drives or external hard drives. Further yet, in various implementations, system controller 20 can be communicatively connectable to a remote server network 212, e.g., a local area network (LAN) or a wide area network (WAN), via a wired or wireless link. Accordingly, the system controller 20 can communicate with the remote server network 212 to upload and/or download data, information, algorithms, software programs, and/or receive operational commands. Additionally, in various implementations, system controller 20 can be structured and operable to access the Internet to upload and/or download data, information, algorithms, software programs, etc., to and from Internet sites and network servers. In various embodiments, the various software, programs, algorithms, and/or code executed by the processor(s) 200 to control the operations of the inoculation system 10 and/or other sensing/treatment systems described herein can be top-level system control software that not only controls the discrete hardware functionality of the inoculation system 10, but also prompts an operator for various inputs. Various other embodiments can utilize relay logic.

Referring now to FIGS. 6 and 9A through 9E, an operational cycle of the inoculation system 10 will now be described in accordance with an exemplary embodiment of the inoculation system 10. Although only a single side of the inoculation system 10 is shown in FIGS. 9A through 9E and will be described with regard to only a single row of plants/stems 34, it should be understood that the inoculation system 10 can include a plurality of stem inoculation mechanisms 18 disposed on one or both sides of the inoculation system 10 and be advanced between and along two or more rows of plants/stems 34 simultaneously.

Figure 9A:
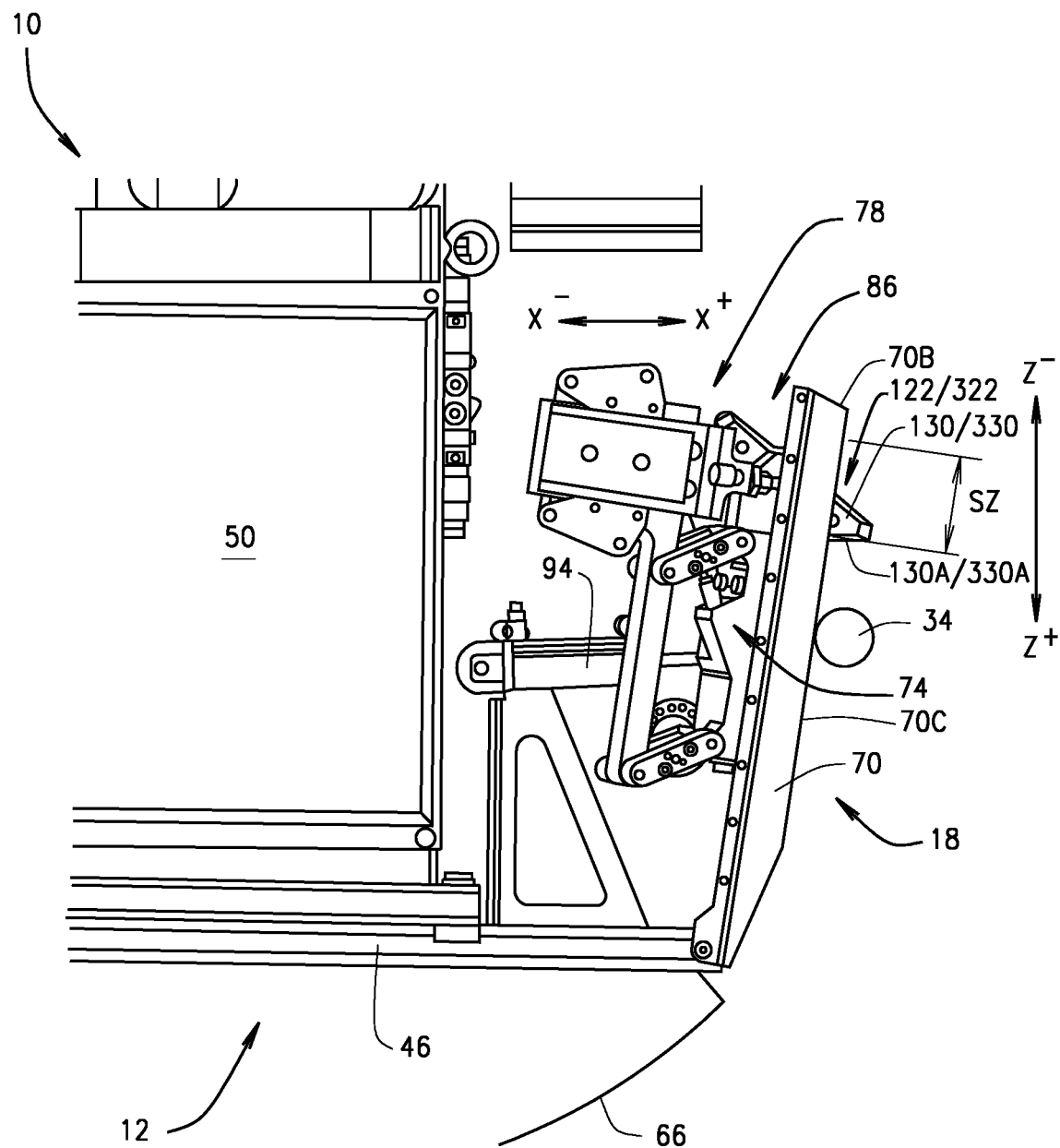
FIGS. 9A-9E illustrate an operational cycle of the stem inoculation system shown in FIG. 1, in accordance with various embodiments of the present disclosure.
Figure 9B:
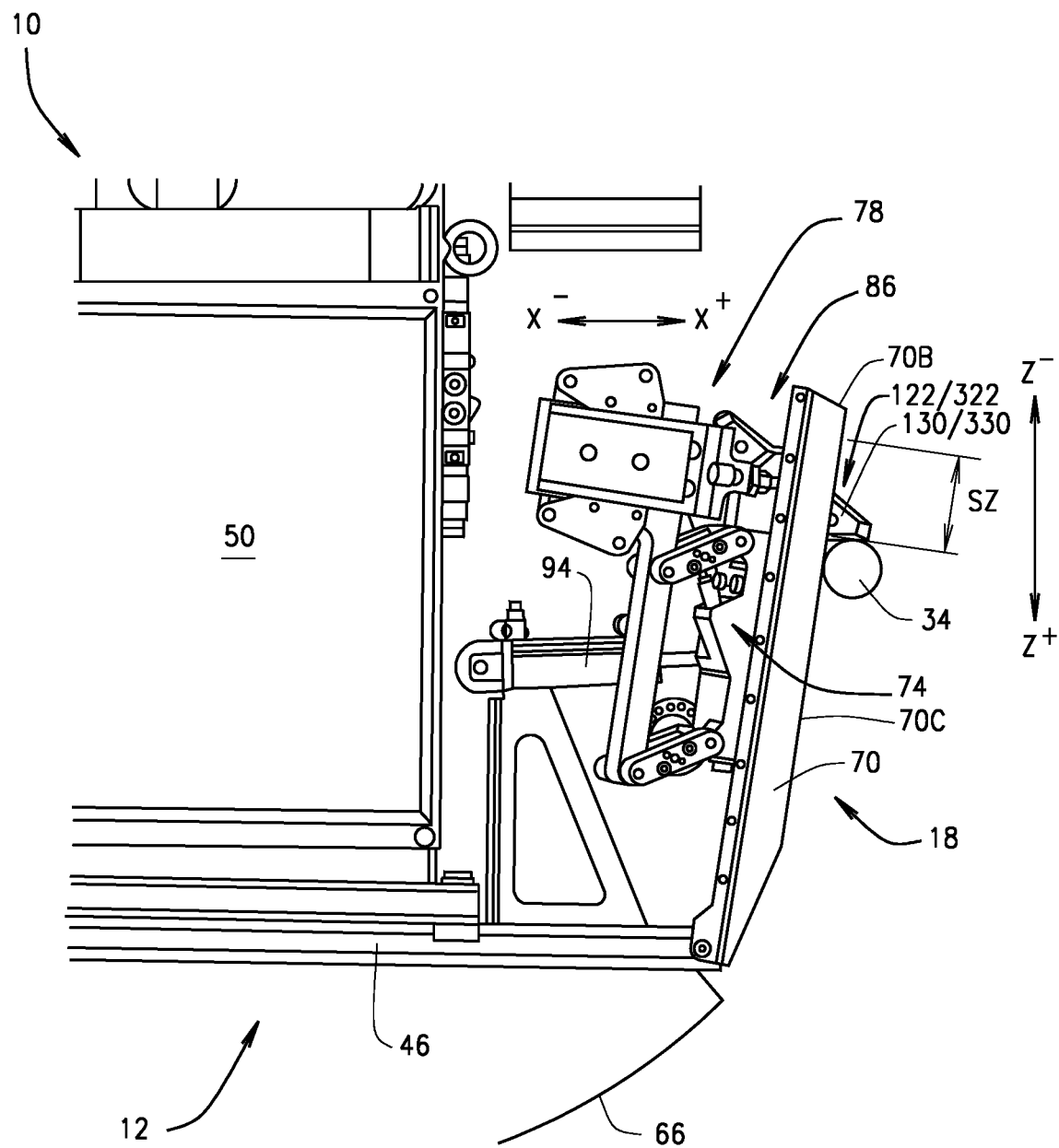

As described above, the inoculation system 10 is advanced (manually or via prime mover 30) along a row of plants/stems 34 such that when the guiderail 70 is in the Home the distal end 70B of the guiderail 70 is located as far away from the mobile platform 12 in the $X^+$ direction as the limits of the biasing device 94, and/or the structure of the respective inoculation mechanism 18 will allow. More particularly, the inoculation system 10 is advanced along and adjacent the row of stems 34 such that when in the Home position, the guiderail 70 will extend into and intersect with the row of stems 34. Accordingly, as the inoculation system 10 advances in the $Z^+$ direction along the row of stems 34 an initial stem 34 in the row will contact the face 70C of the guiderail 70, as shown in FIG. 9A. As the inoculation system 10 continues to advance in the $Z^+$ direction along the row of stems 34, the contact with the stem 34 will push the guiderail 70, injection assembly 78 and centering assembly 86 inward toward the mobile platform 12 in the $X^-$ direction and continue to slide along the face 70C of the guiderail 70 in the $X^-$ direction, as shown in FIG. 9B.

Figure 9C:
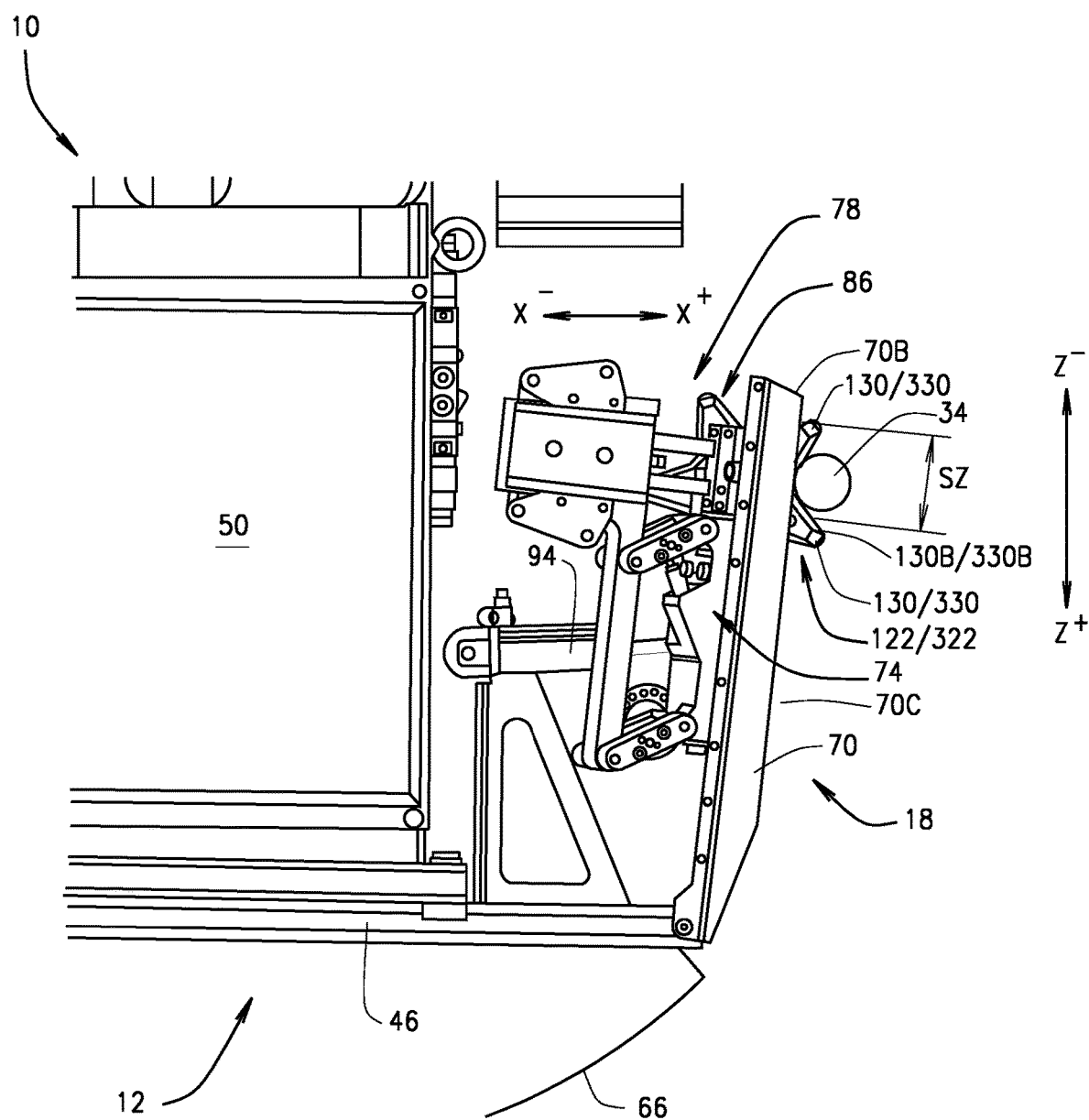

As the inoculation system 10 continues to advance in the $X^+$ direction along the row of stems 34, the respective stem 34 will continue to slide along the guiderail face 70C in the $Z^-$ direction and subsequently contact the leading edge 130A of a respective star wheel arm 130 that is extending beyond the guiderail face 70C, thereby causing the star wheel 122 to rotate. As the inoculation system 10 continues to advance, the respective stem 34 will continue to slide along the guiderail face 70C in the $Z^-$ direction pushing on the leading edge 130A of the respective star wheel arm 130 causing the star wheel 122 to rotate. Consequently, a trailing edge 130B of an adjacent star wheel arm 130 (i.e., the next star wheel arm 130 relative to the rotation of the star wheel 122) will contact the stem 34 such that stem 34 will simultaneously be in contact with adjacent star wheel arms 130 and positioned within the valley 134 between the two respective star wheel arms 130, at which point the respective stem 34 will have entered the strike zone SZ, as shown in FIGS. 9B and 9C.

As the inoculation system 10 continues to advance in the $Z^+$ direction, the respective stem 34 will continue to slide along the guiderail face 70C in the $Z^-$ direction rotating the star wheel 122 until a sensor pin 146 of a corresponding star wheel arm 130 aligns with the strike zone sensor 142. Consequently, the strike zone sensor 142 will sense alignment with the sensor pin 146 and send a strike signal to (or otherwise communicated with) the actuator controller (e.g., the system controller 20, and/or other controller, control device, or electronic circuit) indicating that a valley 134 and corresponding a stem 34 disposed therein are substantially centered in front of the needle 58. Upon receipt of the strike signal, the actuator controller triggers, energizes or activates the actuator 106, whereafter the actuator 106 extends the needle head 114, inserting the needle 58 into the respective stem 34, as shown in FIG. 9C. Subsequent to, or substantially simultaneously with, insertion of the needle 58 into the respective stem 34 the system controller 20 controls operation of the inoculum propellant apparatus 62 to dispense inoculum from the needle 58, via the inoculum tank 50 and flow tubes 54, thereby injecting the respective stem 34 with the inoculum.

Figure 9D:
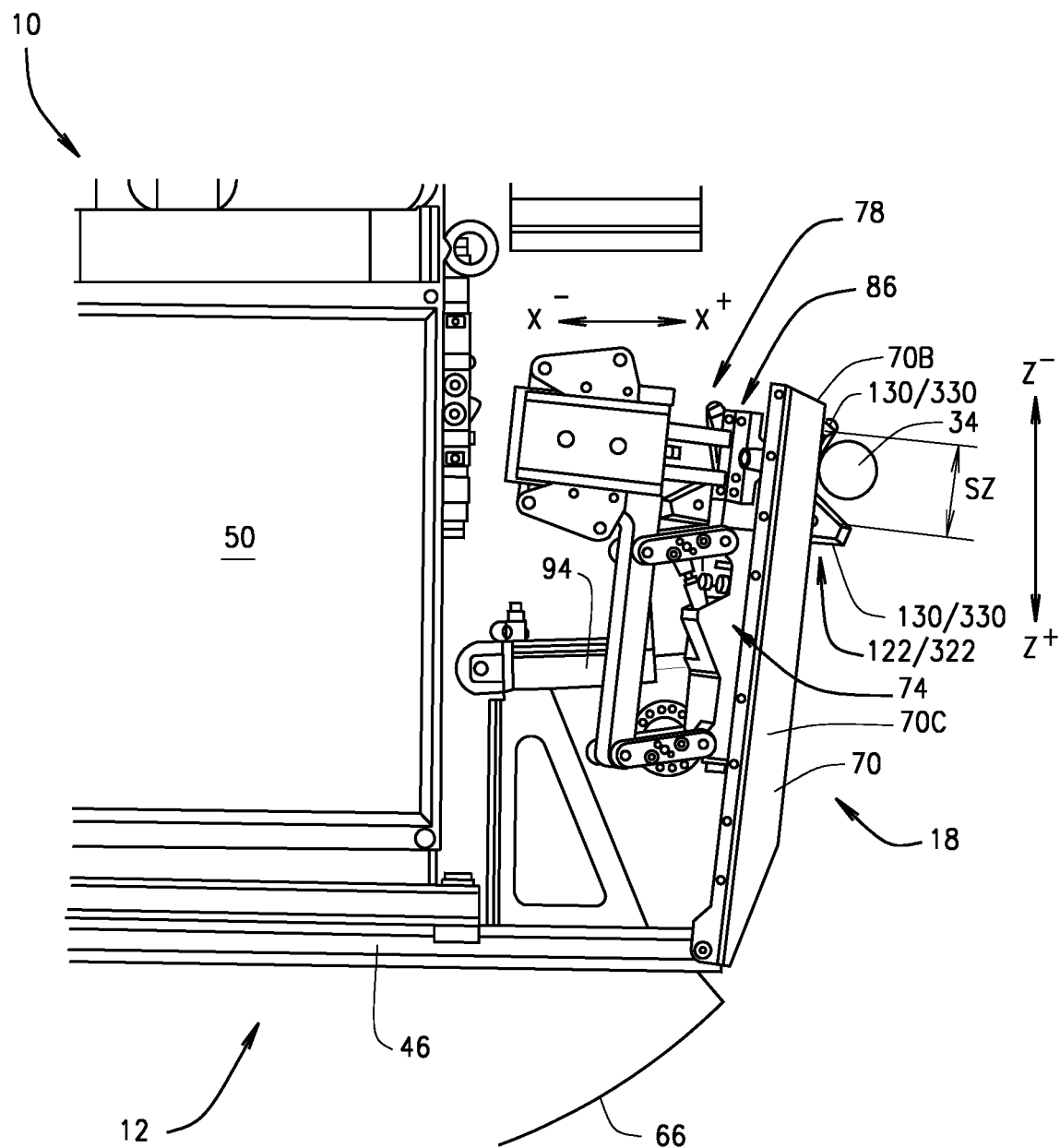

As described above, upon insertion of the needle 58 into each respective stem 34 the transition member 82 of the linkage assembly 74 is moved in the $Z^-$ direction, via force applied on the needle and injection assembly 78 resulting from the needle 58 being inserted into a stem 34 as the inoculation system 10 continues to advance along the row, as shown in FIG. 9D. More specifically, when the injection assembly 78 is operated to inject a given stem 34 with the inoculum, the needle 58 is inserted into the respective stem 34 and remains within the respective stem 34 for a brief period of time, e.g., 0.25-0.75 seconds, while the inoculum is injected into the respective stem. During this time the inoculation system 10 will continue to advance along the row of stems 34 in the $Z^+$ direction without stopping causing the respective stem 34 to exert a force (e.g., a lateral force in the $Z^-$ direction) on the needle 58, and consequently on the injection assembly 78 and transition member 82 of the linkage assembly 74. This force on the transition member 82 will overcome the resistive force of the linkage biasing device 102 causing the transition member 82 to move (e.g., pulling the transition member 82) from the Set position in the $Z^-$ direction. Therefore, the needle 58 and stem 34 do not move laterally relative to each other and the needle 58 remains in substantially the same orientation within the stem 34 throughout the injection process. The transition of the transition member 82 from the Set position to the Extraction position prevents the needle 58 from being pried laterally, or sideways, within the respective stem 34 and from ripping, tearing or otherwise damaging the stem 34 as the inoculation system 10 continues to advance in the $Z^+$ direction.

Figure 9E:
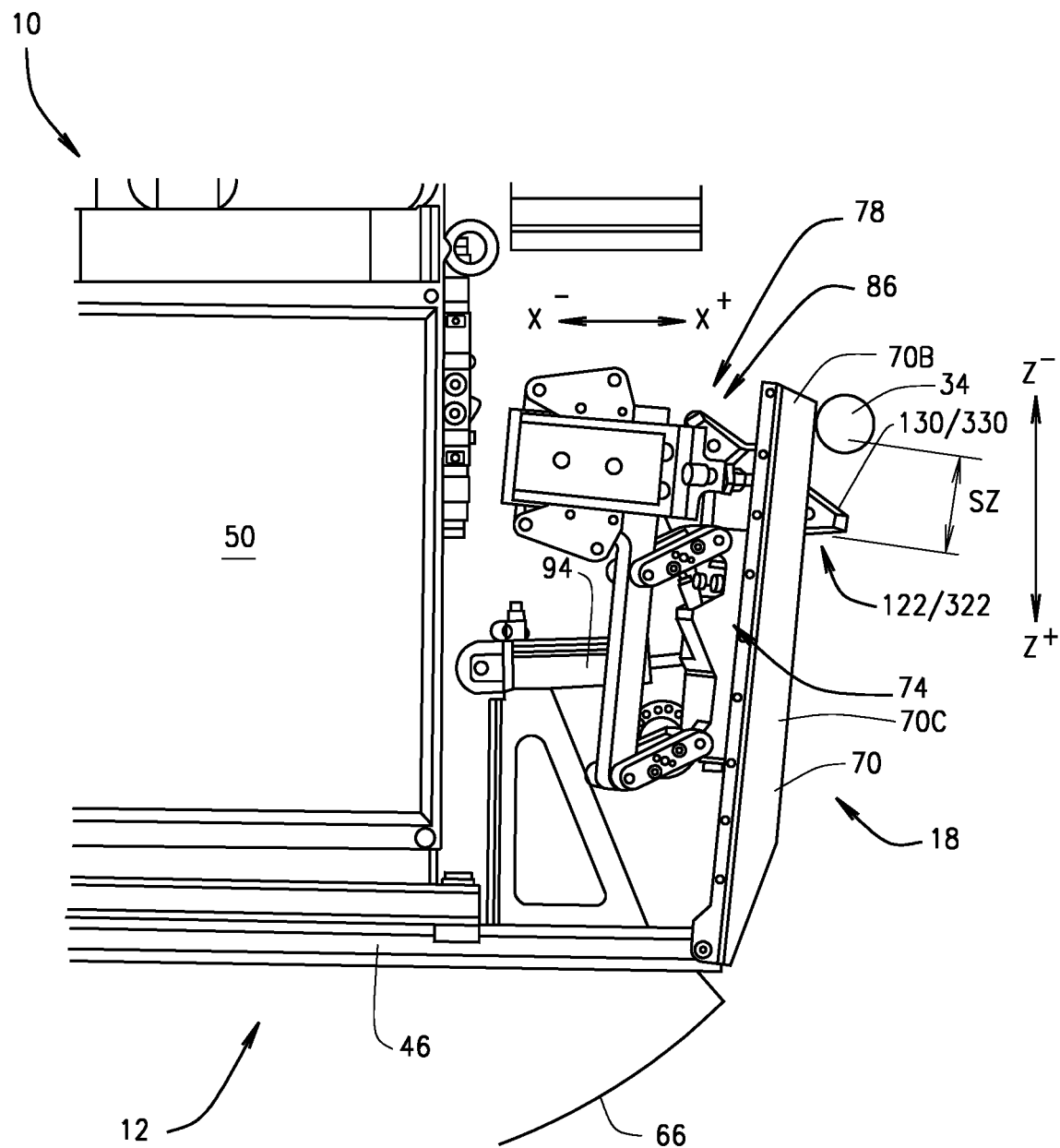

Upon completion of injecting the inoculum into the respective stem 34, the actuator will extract the needle 58 from the stem 34 as the inoculation system 10 continues to advance in the $Z^+$ direction. Consequently, the respective stem will exit the strike zone SZ and the linkage biasing device 102 will cause the transition member 82 to move from the Extraction position in the $Z^+$ direction back to the Set position, as shown in FIG. 9E. Subsequently, the inoculation system 10 will continue to advance along the row in the $Z^+$ direction, the stem 34 will slide off the distal end 70B of the guiderail 70 and the biasing device 94 will push the guiderail 70 outward in the $X^+$ direction and return the guiderail 70 to the Home position. Thereafter, the inoculation system 10 will continue to advance along the row in the $Z^+$ direction and the next stem 34 in the row will contact the guiderail face 70C and the process will be repeated.

It is envisioned that in various embodiments, the stem inoculation system 10 can be structured and operable to perform additional and/or alternative functions such as tracking inoculations and/or stand count via data logging and/or wireless linking to a database. For example, it is envisioned that in various embodiments the system 10 can be implemented in a stand counter mode wherein the system 10 can be utilized to count the standing stems 34 in a row of corn. In such embodiments, operation of the system 10 can be modified such that the injection assembly 78 is deactivated while the system controller 20 detects and counts standing stems 34.

It is envisioned that the system 10, as described herein, can further include any sort of sensor, sensing and/or treating system known in the art to collect samples and/or information to determine one or more biochemical, genotypic, phenotypic, or environmental characteristics of plants, animals, and/or microbes and/or environment in an area where plants are grown and/or apply some treatment to a plant and/or its environment.

As described above, the centering assembly 86 is structured and operable to timely activate the actuator 106 such that each stem 34 will be injected/inoculated as the center of each respective stem 34 is substantially centered in front of the needle 58. Therefore, each stem 34 will be injected/inoculated substantially in the center of the respective stem 34. More specifically, the centering assembly 86 and method of operation described above is structured and operable to accurately detect the center of each plant stem 34 and correlate the position with a position on the earth's surface. It is envisioned that the centering assembly 86 can be utilized and implemented to provide an accurate estimate of each plant's location in 2-D and/or 3-D space and/or the plant's/stem's latitude and longitude on the surface of the earth and/or its location in a growing area. Methods of determining a stem's precise location described herein have advantages over current imaging systems used for this purpose, whose view might be obscured by the plant canopy and/or other plant organs.

Although the present disclosure has been described above in terms of specific embodiments, e.g., in terms of the inoculation system 10, the present disclosure can be described in terms of various broader embodiments, wherein the present disclosure provides a mechanized, non-disruptive plant contact sensing system that is structured and operable to detect by contact, or touch, the precise location of plants and/or plant stems 34 relative to the system as the system moves through the field. In such embodiments, the mechanized, non-disruptive plant contact sensing system will be referred to herein as mechanized, non-disruptive plant contact sensing system 300.

In various such embodiments, the mechanized, non-disruptive plant contact sensing system 300 generally includes the mobile platform 12, a plant contact sensing assembly 302 mounted to the mobile platform 12, and the system controller 20 structured and operable to control automated operations of the sensing system 300. The plant contact sensing assembly 302 comprises one or more plant contact sensing mechanism 304. Each plant contact sensing mechanism 304 comprises a plant centering assembly 86 (exemplarily described above). That is, in various such embodiments, the mechanized, non-disruptive plant contact sensing system 300 can generally comprise the components, assemblies, mechanisms and devices of the inoculation system 10 described above absent the linkage assembly 74 and/or the injection assembly 78. Notwithstanding, it should be understood that any one or more plant operation and/or data/sample collection assembly, mechanism and/or device structured and operable to perform an operation on and/or collect data/samples from the plants and/or the surrounding planting area/environment (e.g., the linkage assembly and/or injection assemblies 74 and/or 78 described above) can be mounted to the mobile platform 12, within the sensing system 300, and triggered or activated by a corresponding centering assembly 86, as exemplarily described above with regard to the injection assembly 78.

Such plant operation and/or data/sample collection assemblies can be any device, assembly, and/or mechanism a user might want to be triggered by the centering assembly 86 at some position relative to a stem 34 positioned in a "Cradled" position (described below) within a respective plant receptacle 308. In various embodiments (e.g. stand counting), the centering assembly 86 can be utilized to simply identify the presence and/or location of each plant stem within a test plot. In various instances, the location can be correlated to a geospatial location, via a global positioning service, or any other recognized form of location or spatial orientation. In various embodiments, the centering assembly 86 can be utilized to activate/actuate other devices of the plant contact sensing system 300, including additional sensors and/or agriculture treatment applicators useful for crop improvement and/or crop production (e.g. cameras, injectors, sprayers, soil or tissue samplers, etc.).

Figure 11:
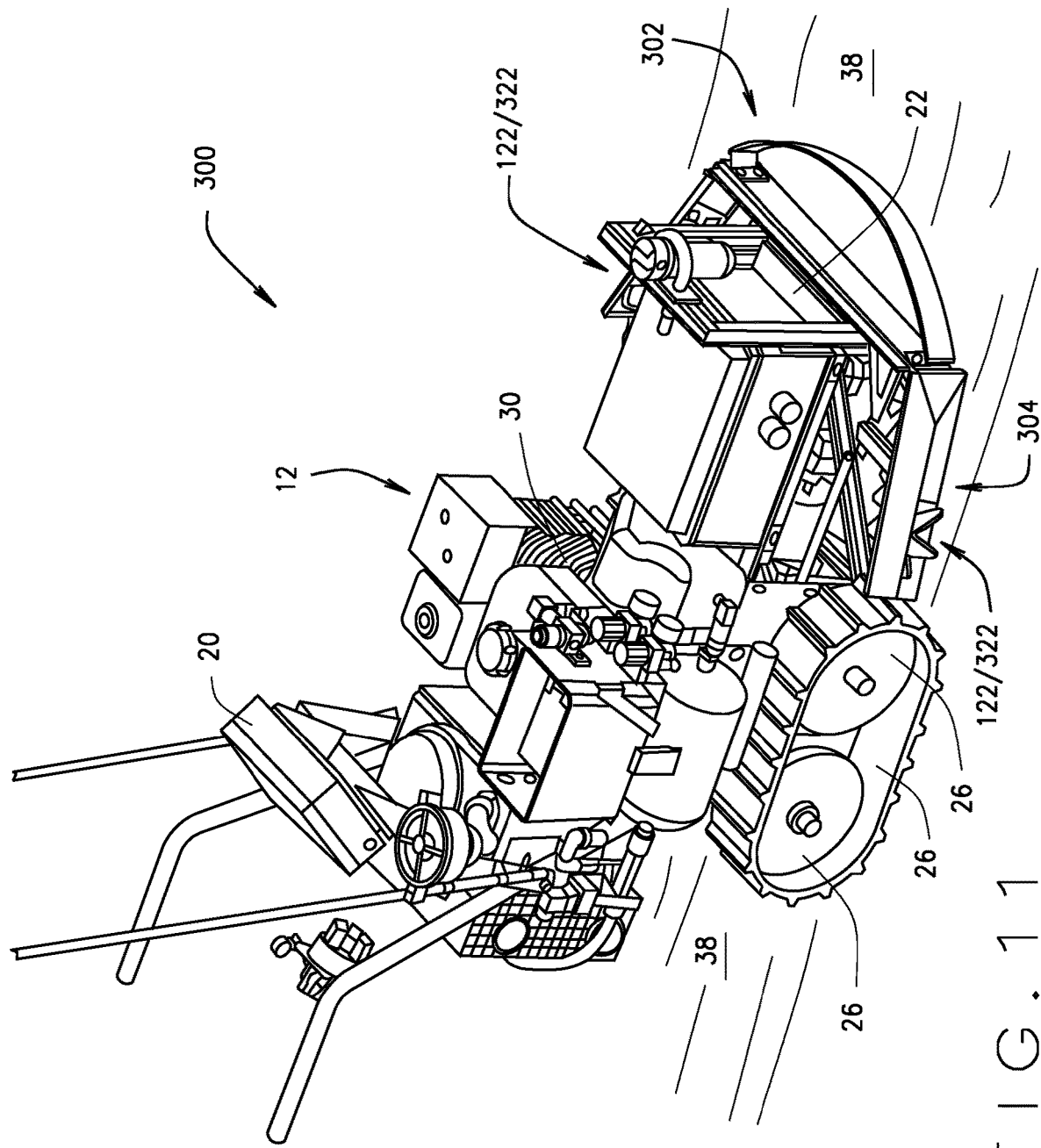
FIG. 11 is an isometric view of the mechanized, non-disruptive plant contact sensing system shown in FIG. 1, in accordance with various embodiments of the present disclosure.
Figure 12:
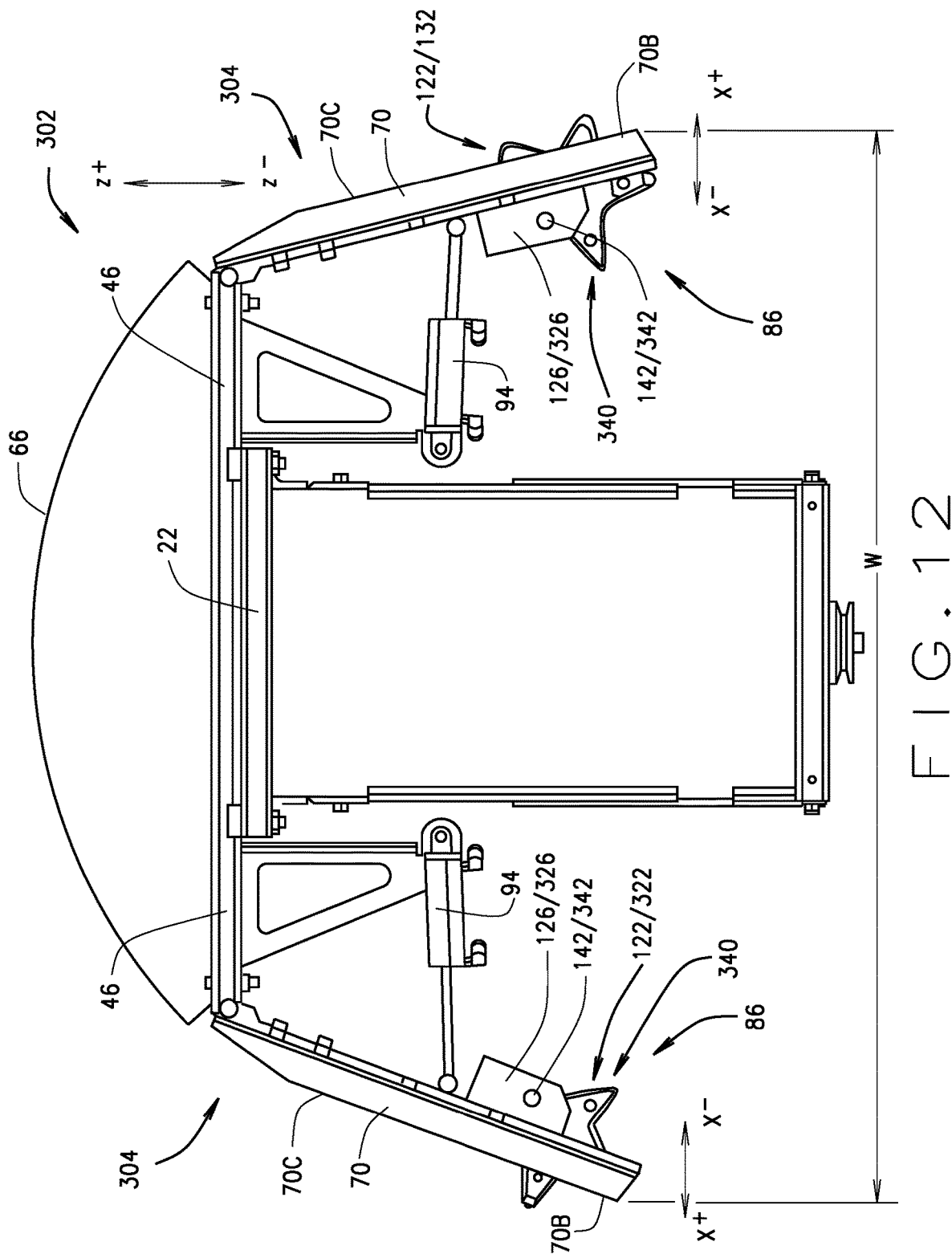
FIG. 12 is a top view of the mechanized, non-disruptive plant contact sensing system shown in FIG. 11, in accordance with various embodiments of the present disclosure.
Figure 13A:
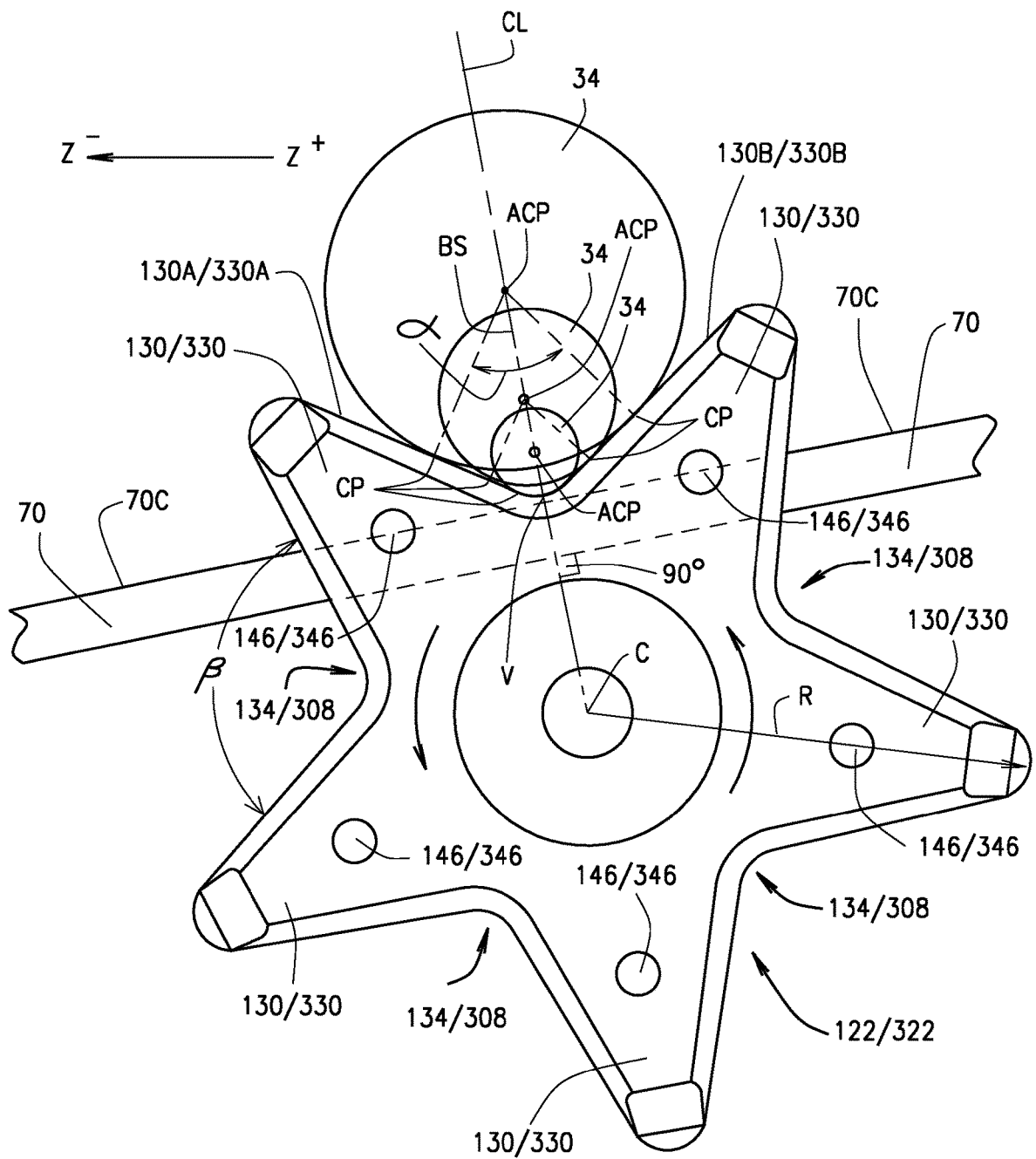
FIG. 13A is a schematic top view of a centering sensor of the mechanized, non-disruptive plant contact sensing system shown in FIG. 11, in accordance with various embodiments of the present disclosure.
Figure 13E:
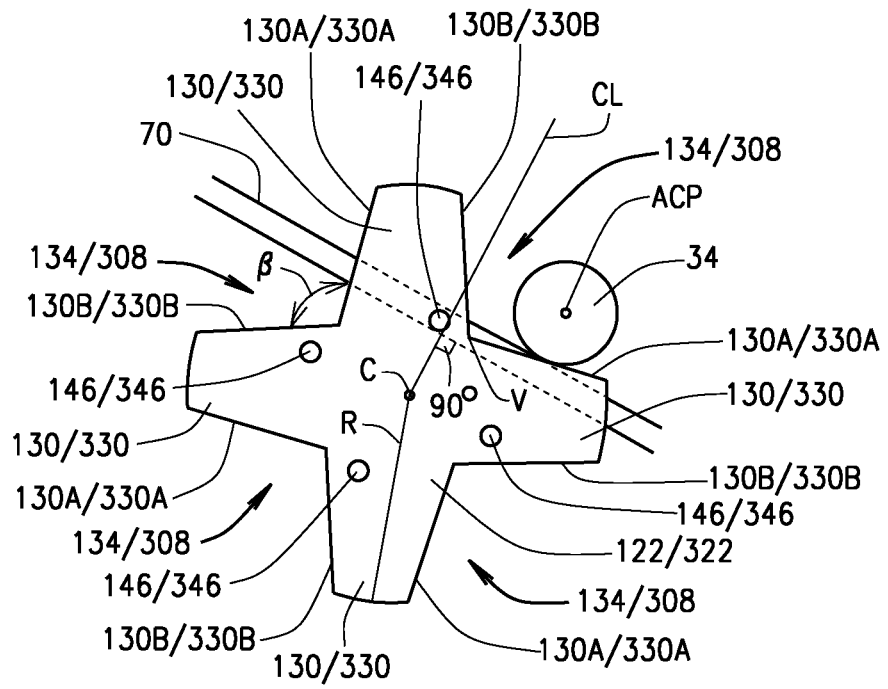

Referring now to FIGS. 11 and 12, in various implementations, each plant contact sensing mechanism 304 is mounted to one or more portion of the mobile platform chassis 12. For example, in various embodiments, each plant contact sensing mechanism 304 can be pivotally mounted (e.g., pivotally) to the carrier beam 46 such that each plant contact sensing mechanism 304 extends rearward from the carrier beam 46 toward a rear of the mobile platform 12. As described above, in various embodiments, the carrier beam 46 can be adjustably mounted to the chassis 22 such that a distance above the ground of the carrier beam 46, and hence the distance above the ground 38 of each plant contact sensing mechanism 304, can be similarly adjusted. Although, the embodiments exemplarily illustrated in FIGS. 11 and 12 show the plant contact sensing assembly 302 including two plant contact sensing mechanisms 304, it should be understood that the plant contact sensing assembly 302 (and, hence the sensing system 300) can include one, three or more plant contact sensing mechanisms 304 and remain within the scope of the present disclosure. Additionally, although the mobile platform 12 is exemplarily shown in FIG. 11 as a walk behind style mobile platform, it is envisioned that the mobile platform 12 can be a larger vehicle suitable for traversing the field while operably disposing one or more plant contact sensing assemblies 302, each including one or more plant contact sensing mechanisms 304, between two or more rows of plants/stem 34, and remain within the scope of the present disclosure.

In various embodiments, the sensing system 300 can include the fender or brush guard 66 that is mounted to and extends forward of the carrier beam 46. As described above, the fender/brush guard 66 is structured and operable to protect the front of the mobile platform 12 and sensing assembly 302 from damage by such things as weeds, crop debris, etc., that may come into contact mobile platform 12 and/or sensing assembly 302 during operation of the sensing system 300. Additionally, in various embodiments, the fender/brush guard 66 can assist in keeping the sensing system 300 substantially centered between the rows of stems 34 as the system 300 moves forward between the rows of stems 34. The fender/brush guard 66 can be fabricated of any material and have any size, shape, construction or configuration suitable to perform the tasks described above.

Referring particularly to FIG. 12, in various embodiments, each plant contact sensing mechanism 304 additionally comprises a guiderail 70 that is pivotally connected to the carrier beam 46 at the proximal end 70A and the respective centering assembly 86 mounted to a backside of the guiderail 70. As described above the guiderail 70 is pivotally connected to the carrier beam 46 at the proximal end 70A such that an opposing distal end 70B of the guiderail 70 can move toward and away from the mobile platform 12 in the $X^+$ and the $X^-$ directions. Moreover, since the centering assembly 86 is mounted to the back side of the guiderail 70, the centering assembly 86 will move toward and away from the mobile platform 12 in the $X^+$ and the $X^-$ directions in accordance with the movement of the guiderail distal end 70B. Importantly, the guiderail distal end 70B, and hence the respective centering assembly 86, is/are biased away from the mobile platform 12 in the $X^+$ direction, via the biasing device 94 of the respective sensing mechanism 304. The biasing device 94 can be mounted within the sensing system 300 in any manner suitable to exert a biasing force in the $X^+$ direction on the guiderail distal end 70B, and/or the centering assembly 86. Additionally, as set forth above the biasing device 94 can be any suitable biasing device, e.g., a spring, pneumatic or hydraulic actuator/piston, etc., that is structured and operable to exert a biasing force in the $X^+$ direction on the guiderail distal end 70B and/or the centering assembly 86 such that in the Home or static position the distal end 70B of the guiderail 70 is located as far away from the mobile platform in the $X^+$ direction as the limits of the biasing device 94, and/or structure of the sensing system 300 allow.

Similar to the description above with regard to FIG. 3, in various embodiments, wherein each plant contact sensing assembly 302 comprises a pair of plant centering systems 304 (as exemplarily shown in FIGS. 11 and 12), the distal ends 70B of the respective guiderails 70 define the wingspan W that can be wider than the distance between opposing rows of stems 34 (see FIG. 2), which allows the sensing system 300 to remain substantially centered between opposing rows of stems 34 and improves identification of a center plane of each of the stems 34. Accordingly, in such embodiments, when the sensing system 300 moves between the rows, each stem 34 in each row will sequentially contact the respective guiderail 70 and push the respective guiderail 70 inward in the $X^-$ direction against the resistive force of the respective biasing device 94. Alternatively, in various embodiments wherein each sensing assembly 302 comprises a single sensing mechanism 304 disposed along only one side of the mobile platform 12, the sensing system 300 must be guided or driven in close enough proximity to a row of stems 34 such that as the sensing system 300 moves along, adjacent the respective row, each stem 34 in the respective row will sequentially contact the respective guiderail 70 and push the respective guiderail 70 inward in the $X^-$ direction against the resistive force of the respective biasing device 94. Hence, each biasing device 94 is structured and operable to allow the guiderail distal end 70B and respective centering assembly 86 to be moved inward in the $X^-$ direction toward the mobile platform 12 as the guiderail 70 contacts a stem 34 as the sensing system 300 moves forward along the ground surface 38 adjacent at least one row of stems 34 (e.g., between two rows of stems 34). Subsequently, as described further below, once a stem 34 slides past the distal end 70B of the guiderail 70, the biasing device 94 will return the guiderail distal end 70B and centering assembly 86 to the Home position.

Referring now to FIGS. 12, 13A, 13B, 13C, 13D and 13E, in various embodiments of the sensing system 300, the centering assembly 86 comprises a centering sensor 322 (e.g., the star wheel 122 described above). The centering sensor 322 can be any device structured and operable to determine when each stem 34 in the row becomes positioned, located, or situated, in a 'Cradled' position within the centering sensor 322 (as described further below). In various embodiments, the centering sensor 322 comprises a device having at least one stem receptacle, valley, notch, indent, recess, etc., 308 that disposed between a pair opposing arms 330. For example, if the centering sensor 322 comprises a single stem receptacle 308, the centering sensor 322 will comprise two arms 330 (FIG. 13B); if the centering sensor 322 comprises two stem receptacles 308, the centering sensor 322 will comprise four arms 330 (FIG. 13C); if the centering sensor 322 comprises three stem receptacles 308, the centering sensor 322 will comprise three arms 330 (FIG. 13C); if the centering sensor 322 comprises four stem receptacles 308, the centering sensor 322 will comprise four arms 330 (FIG. 13D); if the centering sensor 322 comprises five stem receptacles 308, the centering sensor 322 will comprise five arms 330 (FIG. 13A); etc. Each stem receptacle 308 includes a leading face (or edge) 330A (e.g., the leading face/edge 130A described above) disposed along an edge of a leading arm 330 and an opposing trailing face (or edge) 330B (e.g., the trailing face/edge 130B described above) disposed along an edge of a trailing arm 330 and is structured to momentarily contact and receive the stems 34 as the sensing system 300 moves adjacent the respective row(s) of plants. For example, in various embodiments, the centering sensor 86 can comprise the star shaped wheel 122 described above. It should be understood that (as described further below) each arm 330 can be (e.g., serve as) a leading arm 330 at one point during operation of the respective centering sensor 322, and subsequently be (e.g., serve as) a trailing arm 330 at a subsequent point during operation of the respective centering sensor 322. In various embodiments, the centering assembly 86 further includes a hub 326 (e.g., the hub 126 described above) that is directly or indirectly connected to the back side of the respective guiderail 70. The centering sensor 322 is rotationally or slidingly mounted to the hub 326.

In operation, as each respective stem 34 contacts the guiderail 70 and slides along the face 70C thereof as the sensing system 300 advances along the row(s) of plants, the centering assembly 86 determines, via direct contact with the plants stems 34, when each respective stem 34 is positioned, located, or situated in a 'Cradled' position within a stem receptacle 308 of the centering sensor 322 (as described further below). Each stem 34 is positioned, located, or situated in the Cradled position, when each respective stem 34 becomes momentarily cradled between (i.e., momentarily simultaneously in contact with) the leading and trailing faces 330A and 330B of a respective stem receptacle 308. More particularly, a stem 34 will be is positioned, located, or situated in the Cradled position when the respective stem 34 is momentarily simultaneously in contact with both the leading and trailing faces 330A and 330B of a stem receptacle 308. When a stem is in the Cradled position, the stem 34 will be momentarily simultaneously in contact with both the leading and trailing faces 330A and 330B at contact points CP of the leading and trailing faces 330A and 330B, as exemplarily illustrated in FIG. 13A.

As described above, the centering assembly 86 is mounted to the guiderail 70 and is structured and operable to determine when each stem 34 in the row is cradled within a stem receptacle 308 of the respective centering sensor 322. More particularly, the centering assembly 86 is structured and operable to determine when an approximate center point ACP of each respective stem 34 is approximately aligned with, or intersected by, a centering line CL of the centering assembly 86. The centering line CL is a virtual line that extends from a center C of the respective centering sensor 322 toward the guiderail 70 and intersects the backside of the guiderail 70 at a 900 angle (i.e., at a right angle). Particularly, when any one of the stem receptacle(s) 308 of the respective centering sensor 322 is in a 'Cradling' position, the centering line CL will bisect a vertex V of the respective stem receptacle 308, as exemplarily illustrated in FIGS. 13A, 13B and 13D. Moreover, when any one of the stem receptacle(s) 308 of the respective centering sensor 322 is in a 'Cradling' position, the centering line CL will be collinear with the bisector BS of the opposing arms 330 (described above). The vertex V of each stem receptacle 308 is the nadir, or bottom, of the stem receptacle 308 where the leading and trailing faces 330A and 330B meet. Hence, the CL will bisect the angle formed by the leading and trailing faces 330A and 330B of a respective stem receptacle 308 when the stem receptacle 308 is in the Cradling position. As described further below, when a stem receptacle 308 is in the Cradling position, a corresponding stem 34 will be in the Cradled position, i.e., the stem 34 will be cradled within the stem receptacle 308. The vertex V can be generally any shape. For example, the vertex V can be a sharp V-shaped junction of the leading and trailing faces 330A and 330B, a rounded bottom open top U-shaped junction of the leading and trailing faces 330A and 330B, a flat bottom open top U-shaped junction of the leading and trailing faces 330A and 330B, or any other shaped formed at the of the leading and trailing faces 330A and 330B.

In various embodiments, the centering sensor 332 is generally a flat disc-like device having a perimeter that can have any general shape, and comprises one or more stem receptacle(s) 308, as exemplarily illustrated in FIGS. 13A, 13B, 13C, 13D and 13E. However, for clarity and simplicity, the centering will be described here as having a star shape comprising a plurality of arms 330 and a plurality of stem receptacles 308. For example, as exemplarily illustrated in FIG. 13A, in various instances centering sensor 322 can comprise five arms 330 that are shaped and sized to form five of stem receptacles 308 between each adjacent set of arms 330. The stem receptacles 308 are sized and shaped to accommodate and momentarily cradle each stem 34 between the adjacent arms 330 as the system 300 advances along the row(s). The centering sensor 322 is rotationally mounted to the hub 326 and the hub 326 is directly or indirectly connected to the guiderail 70, such that at any given time or point in the rotation of the centering sensor 322, at least a portion of one arm 330 will extend beyond the face 70C of the guiderail 70. More specifically, at any given time or point in the rotation of the centering sensor 322 at least a portion of one arm 330 will be extended beyond the face 70C of the guiderail 70 into the path of each stem 34 as each stem 34 slides along the face 70C of the guiderail 70 as the contact sensing system 300 advances along the respective row(s) of stems 34. In various embodiments, the guiderail 70 includes a wheel aperture (e.g., wheel aperture 138) through which the arms 330 of the centering sensor 322 will extend beyond the face 70C of the guiderail 70 into the path of each stem 34.

In operation, as the contact sensing system 300 advances along a row (e.g., between a pair of rows) and a respective stem 34 contacts the face 70C of the guiderail 70, the stem 34 will slide along the guiderail 70 in the $Z^-$ direction pushing the guiderail 70 inward in the $X^-$ direction. As the contact sensing system 300 continues to advance, the stem 34 will contact a leading face 330A of a respective stem receptacle 308 (e.g., the leading face of a respective arm 330) of the centering sensor 322 that is extending beyond the face 70C of the guiderail 70 causing the centering sensor 322 to rotate. As the contact sensing system 300 continues to advance, the respective stem 34 will continue to slide along the face 70C of the guiderail 70 in the $Z^-$ direction pushing on the leading face 330A of the respective centering sensor 322 causing the centering sensor to rotate further. Consequently, the trailing edge 330B of the respective stem receptacle 308 (e.g., the trailing edge 330B of an adjacent star wheel arm 130, i.e., the next star wheel arm 130 relative to the rotation of the star wheel 122) will contact the stem 34 such that stem 34 is simultaneously in contact with the leading and trailing faces 330A and 330B of the respective stem receptacle 308, whereby the respective stem receptacle 308 will be in the Cradling position, and the stem 34 will be in the Cradled position. As described above, when a stem receptacle 308 is in the Cradling position, and a stem 34 is positioned, located or situated in the Cradled position within the respective stem receptacle 308, the centering line CL of the centering assembly 322 will intersect the vertex V of the respective stem receptacle 308 and the approximate center point ACP of the respective stem 34. As described further below, when a stem receptacle 308 is in the Cradling position and a stem 34 is in the Cradled position within the respective stem receptacle 308, such that the centering line CL intersects the vertex V of the respective stem receptacle 308 and the approximate center point ACP of the respective stem 34, a variety of data can be gathered and/or plant operations can be performed by the contact sensing system 300 with regard to each respective stem 34 and/or the surrounding environment (e.g., a variety of sensing systems can be triggered to gather data and/or a variety of treating systems can be triggered to apply treatments by the contact sensing system 300 with regard to each respective stem 34 and/or the surrounding environment).

In various embodiments, the centering assembly 86 comprises a centering sensor position assembly 340 that is structured and operable to sense (i.e., determine, with or without communication with the system controller 20) the position (e.g., a present or real-time position) of the centering sensor 322 as the centering sensor 322 is being rotated, or actuated, via contact with a stem 34. That is, the centering sensor position assembly 340 is structured and operable to sense the rotational, or actuation, position of the centering sensor 322 throughout the movement (e.g., the rotation or the actuation) of the centering sensor 322 as it is being moved (e.g., rotated or actuated) via contact with a stem 34. By sensing the rotational, or actuation, position of the centering sensor 322 during the rotational, or actuation, movement of the centering sensor 322 it is possible to determine where a respective stem 34 is relative to the centering sensor, or any point on the, plant contact sensing mechanism 304, the plant contact sensing assembly 302, and/or the mechanized, non-disruptive plant contact sensing system 300 throughout movement of the centering sensor 322. The centering sensor position assembly 340 can be any type of sensor assembly for sensing the rotational, or actuation, position of the centering sensor 322 during movement of the centering sensor 322. For example, the centering sensor position assembly 340 can be an optical based sensor assembly, an image based sensor assembly, laser based sensor assembly, an electromagnet based sensor assembly, a GPS based sensor assembly, a mechanical trip sensor assembly, an electromechanical based sensor assembly, etc.

For example, in various embodiments, the centering sensor position assembly 340 can comprise at least one position sensor 342 (e.g., the strike zone sensor 142 described above) disposed in the hub 326 and a plurality of sensor pins 346 disposed in the centering sensor 322. The position sensor 342 is communicatively connected to the system controller 20 (or other processor based device of the contact sensing system 300 that may or may not be communicatively coupled to the system controller 20). In such embodiments, the position sensor 342 can be a proximity sensor (e.g., an inductive proximity pin sensor) that is structured and operable to sense when a sensor pin 346 passes, or is in near proximity to, the position sensor 342 as the centering sensor 322 rotates, or actuates. Therefore, by sensing the location of each sensor pin 346 as the centering sensor 322 rotates, or actuates, the position sensor 342 is can determine/sense the rotational, or actuation, position (e.g., movement) of the centering sensor 322 throughout its rotational, or actuation, movement. Hence, in various embodiments, the centering sensor position assembly 34 can sense/determine the rotational, or actuation, position of the centering sensor 322 during the rotational, or actuation, movement of the centering sensor 322, and thereby determine where a respective stem 34 is relative to the centering sensor, or any point on the, plant contact sensing mechanism 304, the plant contact sensing assembly 302, and/or the mechanized, non-disruptive plant contact sensing system 300 throughout movement of the centering sensor 322.

In various embodiments, the centering sensor position assembly 340 can sense/determine when the centering sensor is rotated, or actuated, to a position wherein the vertex V of any of the respective stem receptacles 308 is aligned with (i.e., intersected by) the centering line CL, that is, when any of the respective stem receptacles 308 is in the Cradling position, and hence, a stem 34 is in the Cradled position within the respective stem receptacle 308. As described above, during operation of the contact sensing system 300 to sense plants within a test plot, when a respective stem receptacle 308 is in the Cradling position, a corresponding stem 34 will be disposed within the stem receptacle 308 in the Cradled position. In the exemplary embodiments wherein the centering sensor position assembly 340 comprises at least one position sensor 342 disposed in the hub 326 and a plurality of sensor pins 346 disposed in the centering sensor 322 (e.g., at least one sensor pin disposed within each arm 330 of the centering sensor 322), the sensor pins 346 can be located within the centering sensor 322 such that each time the centering line CL intersects the vertex V of a respective stem receptacle 308 and the approximate center point ACP of the respective stem 34 cradled within the stem receptacle 308, a sensor pin 346 is substantially aligned with, or very near proximity to (e.g., 0.05 inches), the position sensor 342. Hence, when a sensor pin 346 is substantially aligned, or in very near proximity to, the position sensor 342 a signal is sent from the position sensor 342 to the system controller 20 indicating that a stem receptacle 308 is in the Cradling position, and that a corresponding stem 34 is in the Cradled position.

Alternatively, in various other embodiments, it is envisioned that centering sensor position assembly 340, can comprise one or more contact sensor 312 (exemplarily illustrated in FIG. 13A) disposed along each of the leading and trailing faces 330A and 330B of each stem receptacle 308 that is/are structured and operable to sense/determine when a stem 34 is in contact with the respective leading and/or trailing wall 330A and/or 330B. In such embodiments, the contact sensors 312 are communicatively coupled to the system controller 20 (or other processor based device of the contact sensing system 300 that may or may not be communicatively coupled to the system controller 20) such that the system controller 20 (or other processor based device) will determine when a stem 34 is simultaneously in contact with both the leading and trailing wall 330A and 330B of the respected stem receptacle 308. That is, the contact sensors 312 are structured and operable to sense/determine when a stem 34 is positioned/located/situated in the Cradled position within the respected stem receptacle 308, and therefore, when the corresponding stem receptacle 308 is in the Cradling position.

In various embodiments, the centering assembly 86 can additionally include a stem verification system, apparatus or device (not shown) that is structured and operable to verify that a stem 34 is present within a stem receptacle 308 when centering sensor 322 senses/determines that a stem 34 is in the Cradled position and/or the respective stem receptacle 308 is in the Cradling position.

Referring now to FIGS. 13A, 13B, 13C, 13D and 13E, similar to FIG. 10B described above, FIG. 13A exemplarily illustrates a plurality of stems 34 of varying size (e.g., varying diameters of stems) disposed between adjacent arms 330 of the centering sensor 322. As described above, the centering sensor 322 comprises a plurality of arms 330 that are shaped and sized to form one or more stem receptacle(s) 308 between each adjacent set of arms 330, wherein the stem receptacle(s) 308 is/are sized and shaped to accommodate and momentarily cradle each stem 34 between the adjacent arms 330 as the contact sensing system 300 advances along the row. Moreover, the centering sensor 322 is structured to have a radius R selected so that each arm 330 will extend beyond the outside face 70 of the guiderail 70 a catch distance CD (see FIGS. 10A and 13C) sufficient to 'catch' a respective stem 34, whereby the respective stem 34 will rotate the centering sensor 322, whereby the centering sensor 322 will sense/determine when the respective stem receptacle 308 is in the Cradling position and/or the respective stem 34 is in the Cradled position, as described above. That is, the centering sensor 322 is designed so that the arms 330 have a length such that, as each arm 330 is sequentially rotated to extend beyond the guiderail face 70C to contact a subsequent stem 34 (as described herein), a portion of the respective arm 330 extends beyond the guiderail face 70C the catch distance CD that is sufficiently long to prevent any stem 34, regardless of the stem size (e.g., diameter of stem), from sliding off, or bouncing over, the end of the respective arm 330, whereby the respective stem 34 would be sensed by the contact sensing system 300. For example, in various implementations, the radius R can be between 2.00 and 4.00 inches, and the catch distance CD can be between 0.75 and 2.50 inches. Hence, a larger the radius R provides a larger catch distance CD, thereby decreasing the chance a stem 34 being bypassed and not sensed.

As described above, the centering sensor 322 is structured to have a number of arms 330 selected to provide the stem receptacle(s) 308 that have a vertex angle β between the respective leading and trailing faces 330A and 330B (e.g., between the contact edges of adjacent arms 330) that is designed and sized to stably and accurately position/locate/situate each respective stem 34 in the Cradled position such that the approximate center point ACP of the respective stem 34 is momentarily substantially aligned with, or intersected by, the centering line CL of the centering assembly 86, regardless of the stem size (e.g., regardless of the diameter of stem 34). Particularly, in the embodiments wherein the centering sensor 322 is star shaped having sensor pins 346 disposed in each arm 330 (as exemplarily illustrated in FIG. 13A) the centering sensor 322 is designed to have a particular number of arms 330 (e.g., five) and a vertex angle β such that one of the sensor pins 146 will substantially align with the cradling position sensor 342 substantially simultaneously with each time a stem 34 is in the Cradled position and/or a respective stem receptacle 308 is in the Cradling position. In this way, the position of the approximate center point APC of each stem 34, regardless of stem size, will align with, or be intersected by, the centering line CL.

Accordingly, the centering sensor 332 can be designed to have any desired number of arms 330 having any desired vertex angle β such that the centering sensor 332 provides a desired level of accuracy in the sensing/determining the alignment of the approximate center point APC of each stem 34 with the centering line CL as the contact sensing system 300 advances along a row of plants. For example, in various embodiments, the centering sensor 322 can comprise five arms 330 having a vertex angle β of approximately 110° therebetween. It should be noted that the greater the vertex angle β is (e.g., the more obtuse the vertex angle β is) the narrower, or lessor, the angle α (e.g., the more acute the angle α) will be between the contact points CP of the respective stem 34 and the arms 330. In various instances herein the angle α will be referred to as the cradle angle of the respective stem 34. Conversely, the narrower, or lessor, the vertex angle β is (e.g., the more acute the vertex angle β is) the greater the cradle angle α (e.g., the more obtuse the cradle angle α) will be between the contact points CP of the respective stem and the arms 130.

Furthermore, in various embodiments, the centering sensor 322 is designed to have a desired number of arms 330 and a vertex angle β such that: 1) when a first or leading arm 330 extends beyond the guiderail face 70C and is positioned to receive/contact an oncoming stem 34, the subsequent or trailing arm 330, (relative to the direction of rotation of the centering sensor 322) is located behind guiderail face 70C out of the path of the respective stem 34; and 2) after the respective stem 34 has entered and exited the Cradled position the trailing arm 330 is now positioned to receive/contact an subsequent oncoming stem 34, and the next subsequent or trailing arm 330, (relative to the direction of rotation of the centering sensor 322) is located behind guiderail face 70C out of the path of the respective stem 34.

As described above, when a stem receptacle 308 is in the Cradling position and a stem 34 is in the Cradled position within the respective stem receptacle 308, such that the centering line CL intersects the vertex V of the respective stem receptacle 308 and the approximate center point ACP of the respective stem 34, a variety of data can be gathered and/or plant operations can be performed by the contact sensing system 300 with regard to each respective stem 34 and/or the surrounding environment. For example, in various instances the contact sensing system 300 can utilize the contact points CP (and in some instances stored empirical reference data) to determine an approximate circumferential distance of the stem 34 between the contact points CP, referred to herein as the span of contact. Particularly, the span of contact is the circumferential distance of the stem 34 between the contact points CP for the portion of the stem circumference closest to the vertex V of the respective stem receptacle 308. Accordingly, as the vertex angle β decreases, the span of contact increases, and as the vertex angle β increases, the span of contact decreases. The angle vertex β can be any desired angle, for example, in various embodiments the vertex angle β can be between 30° and 160°, e.g., 90° to 120°.

Additionally, the contact sensing system 300 can utilize the contact points CP, and/or stored empirical reference data, and/or the span of contact to determine the cradle angle α. Furthermore, the contact sensing system 300 can utilize the contact points CP, and/or stored empirical reference data, and/or the span of contact, and/or the cradle angle α, and/or the known shape, curvature and vertex angle β of the respective stem receptacle 308 to determine (e.g., extrapolate) the location of the stem 34 approximate center point APC relative to any point on the centering sensor 322 when the approximate center point ACP is aligned with, or intersected by, the centering assembly centering line CL. Even further, the contact sensing system 300 can utilize the contact points CP, and/or stored empirical reference data, and/or the span of contact, and/or the cradle angle α, and/or the known shape, curvature and vertex angle β of the respective stem receptacle 308, and/or the know dimensions of the contact system 300 to determine the location of the stem 34 approximate center point APC relative to any point on the entire contact system 300, or any appendage, device, or apparatus thereof, e.g., a plant operation device such as a camera for collecting optical and/or image data, a spray applicator for spraying a liquid, the inoculation mechanism 18, a soil sampler for acquiring samples of, and/or data from, the soil in which the plants are growing, an air sampler for acquiring samples of, and/or data from, the air surrounding the plants, and/or any other device or apparatus structured and operable to perform an operation on the stems 34 and/or the surrounding environment, when the approximate center point ACP is aligned with, or intersected by, the centering assembly centering line CL, or any other selected time during operation of the centering assembly 86 and/or the centering sensor 322. Furthermore, the contact sensing system 300, e.g., the centering assembly 86, can be utilized to active such devices or apparatus (e.g., a camera, a spray applicator, a soil sampler, the inoculation mechanism 18, etc.) when the centering assembly 86 determines that a stem receptacle 308 is in the Cradling position and/or a stem 34 is in the Cradled position, or any other selected time during operation of the centering assembly 86 and/or the centering sensor 322.

As described above, in various embodiments, the centering assembly 86 can comprise a tensioner 150 (FIG. 7) (e.g., a torsion spring, friction or compression clutch device, or other centering sensor rotation control device (e.g., actuation control device)) that is operably connected to the centering sensor 322 to apply a controlled amount of resistance to the rotation of the centering sensor 322 such that leaves, debris, small or undeveloped stems, etc., do not cause rotation of the centering sensor 322. Particularly, the tensioner 150 is structured and operable to ensure that only stems 34 having a strength and/or size above a designated threshold will cause the centering sensor 322 to rotate such that the centering sensor 322 senses/determines the presence of a stem 34, as described above. Hence, the tensioner 150 applies a force to the centering sensor 322 sufficient to prevent inadvertent rotation of the centering sensor by miscellaneous things such as leaves, debris, small or undeveloped stems, etc., but can be overcome by the force applied to the centering sensor 322 by a stem having a designated strength and/or size sliding along the face 70C of the guiderail 70, as described above. In various implementations, the tensioner 150 can be adjusted to suit the characteristics of the respective stems 34 (e.g. strength, life stage, species, germplasm, etc.) and or the characteristics of the environment (e.g. the size or distribution of weeds, etc.) in which the stems 34 are growing.

As described above, in various embodiments the centering sensor position assembly 340 can include one or more contact, or touch, sensor 312 disposed on the leading and trailing faces 330A and 330B of each stem receptacle 308. The contact sensor(s) 312 is/are structured and operable to sense/determine when a stem 34 is in contact with the respective leading and/or trailing wall 330A and/or 330B. It is envisioned that in various embodiments a plurality of contact sensors 312 can be disposed along each of the leading and trailing faces 330A and 330B to sense/determine where each respective stem 34 contacts the leading and trailing faces 330A and 330B, whereby geometric relationships could then be utilized by the system controller 20 (or other processor based device of the contact sensing system 300) provide a very accurate estimation of the dimensions of each stem 34. In such instances, it is envisioned that the dimensions of each stem 34, the approximate center point APC of each stem 34, the alignment and location of any component, device, system, etc., of the contact sensing system 300 relative to the respective stem (e.g., the approximate center point APC of each stem 34) and vice-versa, could be determined using only the contact sensors 312.

Further to the description above, as this centering sensor 322 rotates due to contact with a stem 34 (as described above), a distance between the center C of the centering sensor 322 and the approximate center point APC of the stem 34 will shortened as the stem 34 slides down the leading face 330A, toward the vertex V of the respective stem receptacle 308, due to rotation or actuation of the centering sensor 322. This effectively allows stem 34 to transition from an initial, single contact point CP with the leading face 330A to the Cradled position having multiple contact points CP with the leading and trailing faces 330A and 330B.

In various embodiments, it is envisioned that the vertex V of each stem receptacle 308 can be rounded, whereby the number of contact points CP between each respective stem 34 and the leading and trailing faces 330A and 330B of the respective stem receptacle 380 can be increased, thereby reducing plant damage and/or disturbance of the plant.

As described above, in the embodiments wherein the centering sensor 322 is star shaped having five arms 330 and five stem receptacles 308, the resulting shape permits one arm 330 to extend past the outside face 70C of the guiderail 70 such that during rotation of the centering sensor 332 each respective stem 34 will rotate/turn/advance the centering sensor 322 such that the subsequent arm 330 (relative to the direction of rotation of the centering sensor 332) is positioned to receive the subsequent stem 34 in the row of plants, without the assistance of any device or mechanism of the contact sensing system 300 to rotate/turn/advance the centering sensor 332. Additionally, in such embodiments, providing the star shaped centering sensor 322 wherein the vertex angle β of each stem receptacle 308 is approximately 110° leads to contact angles (i.e., the angle at which the respective stem 34 contacts the leading and trailing faces 330A and 330B when in the Cradled position) of approximately 70° for corn stalks/stem having a diameter of between 1-2 inches. Empirical testing has shown that this results is an excellent balance between the size of the centering sensor 322, the number of stem receptacles 308 it contains, and the span of contact needed to accurately position each stem 34 in the Cradled position with the respective approximate center point APC aligned with, or intersected by, the centering line CL. It has been found that stem receptacles having a vertex angle β that is narrow (e.g. 25° or less) will result in a larger distance between the vertex V of the stem receptacle 308 and the approximate center point APC of the respective stem 34, which can increase the error in estimating the approximate center point APC of the stem 34 relative to the vertex V and/or the center C of the centering sensor, and/or to any point on the contact sensing device 300. Furthermore, in such embodiments, empirical testing has shown that a star shaped centering sensor 322 having a diameter of approximately 5 inches provides a good balance for achieving a relatively small size centering sensor 322 that has a catch distance CD (e.g., 0.94 inches) and arc lengths between tips, or distal ends, of adjacent arms 330 (e.g., 3.14 inches) needed to reliably detect and distinguish plant stems 34 having diameters between 1-2 inches.

Figure 14:
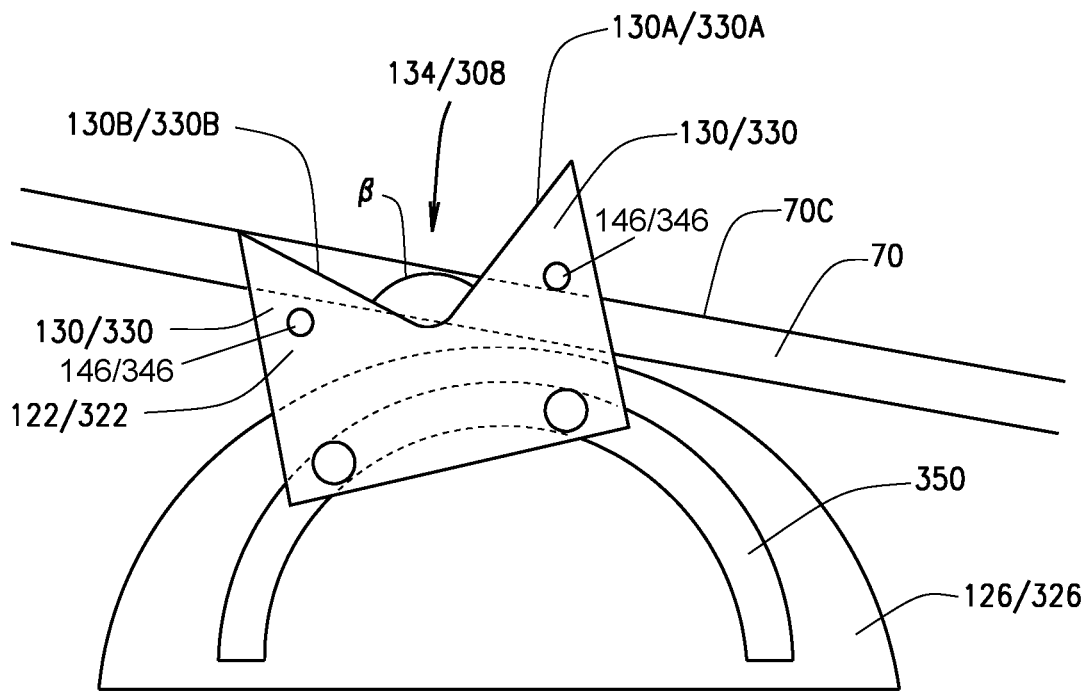
FIG. 14 is a schematic of a centering assembly of the mechanized, non-disruptive plant contact sensing system shown in FIGS. 1 and 11, in accordance with various embodiments of the present disclosure.

Although the centering assembly 86 has been exemplarily described and illustrated above as comprising a rotational, or rotating, centering sensor 122/322, it is envisioned that the centering assembly 86 can include a centering sensor 122/322 that is not a rotating sensor. For example, in various embodiments, as illustrated in FIG. 14, the centering assembly 86 can comprise a sliding centering sensor 122/322 and remain within the scope of the present disclosure. In such instances the sliding centering sensor 122/322 would function and operate to sense the present of stem 34, when the stem 34 is in the Cradled position, and/or when the sliding centering sensor 122/322 is in the Cradling position, in the same manner as described above, except instead or rotating, the sliding centering sensor 122/322 would slide along an arcuate slot 350 of the hub 326. In such instances, the centering assembly would further include a sensor return device (not shown) that is structured and operable to return the sliding centering sensor 122/322 to a Ready position after a stem 34 has entered and exited the Cradled position. The Ready position is the position in which the sliding centering sensor 122/322 is placed prior to contact with each stem 34, as shown in FIG. 14. Hence, the sliding centering sensor 122/322 is in the Ready position prior to contact with a stem 34, then once the respective stem 34 has slid along the outside face 70C of the guiderail 70, contacted the leading face 130A/330A of sliding centering sensor 122/322, and entered and exited the Cradled position (as described above), the sensor return device will return the sliding centering sensor 122/322 to the Ready position in preparation for contact with a subsequent stem 34 in the respective row of plants. Alternatively, it is envisioned that the centering sensor 122/322 can comprise any drum, plate, cog, etc., suitable to detect the presence of a stem 34 as described above.

The various embodiments of the contact sensing system 300 described herein, provide non-disruptive plant contact sensing system 300 that reduces tissue damage to the stems 34 (with regard to known systems) while the system 300 moves alongside the plants in the row. Particularly, to study certain aspects of crop development, it is often desirable to accurately determine the number of at least one type of plant growing in an area. The systems and methods disclosed herein comprise automated methods of accurately determining, through direct physical contact (i.e. touch) with the stem of each plant, the location of each plant stem (or main cluster of stems for some plant species) of a certain type in a growing area. It is envisioned that the systems and methods described herein can be calibrated and/or otherwise adjusted to selectively distinguishing each main plant stalk/stem from one another and from other stems, leaves, and other debris in a typical growing area or field. To study certain aspects of crop development and/or performance, it is often desirable to align certain instruments relative to a target plant organ and/or tissue with a high degree of accuracy. This orienting can be necessary to apply a precision treatment to the plant and/or to sense some characteristic of the plant and/or the plant's environment. Usually, researchers want to minimize secondary effects, especially damage, inflicted on the plant while aligning the instrument or sensing and/or treating the plant or its environment. The systems and methods described above with regard to FIGS. 1 through 14 accomplish this.

For example, in the various embodiments described herein, a plant, or its environment, can be contacted with a wide variety of "agriculture treatment agents." As used herein, an "agriculture treatment agent", or "treatment agent", or "agent" can refer to any exogenously provided compound that can be brought into contact with a plant tissue or its environment that affects a plant's growth, development and/or performance, including agents that affect other organisms in the plant's environment when those effects subsequently alter a plant's performance, growth, and/or development (e.g. an insecticide that kills plant pathogens in the plant's environment, thereby improving the ability of the plant to tolerate the insect's presence). For example, an agriculture treatment agent could be a hormone, an herbicide, or nutrient (e.g. a plant fertilizer). In certain embodiments, the agriculture treatment agent acts extracellularly within the plant tissue, such as interacting with receptors on the outer cell surface. In some embodiments, the agriculture treatment agent enters cells within the plant tissue. In certain embodiments, the agriculture treatment agent remains on the surface of the plant and/or the soil near the plant. In some embodiments, the agriculture treatment agent is contained within a liquid. Such liquids include, but are not limited to, solutions, suspensions, emulsions, and colloidal dispersions. In some embodiments, liquids described herein will be of an aqueous nature. However, in various embodiments, such aqueous liquids that comprise water can also comprise water insoluble components, can comprise an insoluble component that is made soluble in water by addition of a surfactant, or can comprise any combination of soluble components and surfactants. In certain embodiments, the application of the agriculture treatment agent is controlled by encapsulating the agent within a coating, or capsule (e.g. microencapsulation). In certain embodiments, the agriculture treatment agent comprises a nanoparticle and/or the application of the agriculture treatment agent comprises the use of nanotechnology.

Agriculture treatment agents include, but are not limited to, macromolecules including polynucleotides including nucleic acids (e.g. DNA and/or RNA), polypeptides, polysaccharides, polyketides, and the like. Polynucleotides can be single-stranded or double-stranded and can include antisense molecules and interfering RNAs. Polynucleotides can include mutations and/or various other modifications, such as to their backbones, that are well known in the art. Polynucleotides include "genetic elements", which comprise recombinant DNA constructs (commonly referred to as "transgenes") that have been inserted into a plant genome, or a nucleotide sequence, or a genetic locus of a plant genome. Thus, in various embodiments, a user of this invention can deliver a sequence of DNA or RNA to a targeted tissue to alter the expression or inheritance of a plant trait, for example, to effectively "transform" a plant by inserting a genetic element into its genome.

An agriculture treatment solution can refer to any solution of liquid that comprises an agriculture treatment agent. In various embodiments, an agriculture treatment solution can comprise an agriculture treatment agent and the two terms can often be used synonymously. For example, delivering an agriculture treatment solution comprising the agriculture treatment agent glyphosate to a plant is essentially synonymous with delivering an agriculture treatment agent comprising glyphosate to a plant. In certain embodiments, an agriculture treatment agent is an agent known to affect organisms other than a plant, such as plant pathogens and/or organisms that improve crop performance (e.g. soil symbionts). In certain embodiments, systems and methods described herein can be used to contact a plant and/or its environment with a pesticide, such as a herbicide, insecticide, insect growth regulator, fungicide, avicide, rodenticide, bactericide, insect repellent, animal repellent, and/or antimicrobial and/or any combination thereof.

The systems 10 and 300 described herein are not limited to any particular downstream action that incorporates determining the surface and/or approximate center point ACP of a plant stem 34 as described herein. Rather, any method of sensing or treating a plant that can be improved by more accurately positioning the approximate center point ACP of a stem 34 and/or the surface of a stem 34 will benefit from the teachings herein. Once the approximate center point ACP and/or surface of a stem 34 are known, the systems 10 and/or 300 described herein can precisely target those locations with an instrument, and with straightforward calibration, precisely target tissues and/or cells between the approximate center point ACP and the stem surface.

For example, replacing the inoculation mechanism 18, described above, with any tool or device that applies a treatment to a plant tissue or the growing environment of the plant (e.g. soil), will provide improved accuracy of the desired application by knowing the approximate center point ACP and surface location of the stem 34. Moreover, the systems 10 and 300 can utilized for any process that can be improved by more accurately locating plant stems. For example, the systems 10 and 300 can be utilized with any one or more of the following: 1) devices having nozzles and/or needles that spray or inject substances on/into certain plant tissues, including pneumatic injectors (e.g. "jet injectors", capable of penetrating the plant epidermis via a high-pressure jet of liquid); 2) various aspects and devices of the system described in U.S. Pat. Nos. 8,943,746 and 9,167,752, which are incorporated by reference herein in their entirety; 3) any imaging or optics systems that can be directed onto, through, and/or reflected off one or more tissues of the plant (e.g. LIDAR, NIR, X-Rays); 4) structures that shade out ambient light between a device lens and the plant surface (e.g. "cups" around a lens that help seal out ambient light while a measurement is taken; 5) knives, drills, mills, scrapers, abraders, etc.—any sharp surface capable of exposing or removing plant tissue; 6) devices (e.g., needles or scrapers) for collecting core samples from stems; and/or 7) chemical detectors for detecting a chemical in/on/around a plant stem 34 (including air and soil).

It is envisioned that, although the systems 10 and 300 have been described herein with regard for use in crop testing, research and analytics, it is envisioned that the systems 10 and 300 can be utilized in commercial setting and industry where precision delivery a treatment to only specific stems in a growing area can be accomplished. Additionally, although the systems 10 and 300 have been described herein as being mobile platform based systems, it is envisioned that the centering assembly 86 can be implemented as part of any system platform, i.e., a mobile system platform and/or a stationary system platform and/or an articulating mechanical or robotic arm. For example, in various embodiments, the centering assembly 86 can be implemented in automated greenhouses, e.g., the centering assembly 86 can be mounted to robotic arms, or mounted to a stationary fixture or platform adjacent a conveyor belt that passes plants past the systems 18 and 302, or any portion thereof. Furthermore, it is envisioned that the systems 18 and 302, or any portion thereof, can be easily attached to other machines and is not limited to any particular method of mobility. Attaching the systems 18 and 302, or any portion thereof, to any of a wide range of articulating arms known in the art make possible orienting the respective centering sensor 122/322 in any direction to characterize stems growing at any angle. In various embodiments, it is envisioned that centering sensor 122/322 and articulating arm combination can be attached to any other form of mechanized mobility to move the centering sensor 122/322 among and/or between plants in a growing area, including unmanned aerial and/or unmanned ground vehicles (i.e. UAVs, UGVs, etc.). Hence, the systems and methods described herein are not limited to a type of plant or set of agricultural/horticultural methods used to cultivate the plants, nor are the systems and methods described herein limited to specific growing environments or plant types. The systems and methods described herein can be applied to a wide range of horticultural and/or agricultural conditions, used to sense plants growing outdoors in natural or man-altered settings and/or plants growing in artificial environments where an environmental variable known to affect plant performance is controlled (e.g. glass house, shade house, growth chamber, arboretum, etc.).

It is additionally envisioned that systems 10 and/or 300, as described herein, can include additional devices, systems, mechanisms, assemblies and/or apparatuses such that the systems 10 and/or 300 is/are further structured and operable to accurately apply a treatment, or collect a sample, at exactly the midpoint between two plants. In such embodiments, a centering assembly 86 disposed at the front of the mobile platform 12 detects a first plant stem 34, then detects an absence of plant stem 34 for some distance as the mobile platform 12 advances along the row, then detects a second plant. A computer, e.g., the system controller 20, can determine the exact center between the two plant stems 34, then activate a device located rearward on the mobile platform 12 for applying a treatment to apply the treatment to soil/ground 38 between the two plant stems 34.

It is further envisioned that the systems 10 and/or 300, as described herein, can include additional devices, systems, mechanisms, assemblies and/or apparatuses such that the systems 10 and/or 300 is/are further structured and operable to collect a sample, e.g. instead of injecting a liquid into the stems 34, a sample of tissue could be removed from the stems 34 using a suitable device/system, e.g., a syringe, needle or tube, structured and operable pull out a cross-sectional, e.g., a core, from each stem 34, wherein the sample can include such things as a contiguous column of tissue and cells that extends from the epidermis all the way to the center pith of the plant stem. Alternatively, a small hook could be used in conjunction with methods described herein to remove a piece of the surface or interior of the stems 34. In some embodiments, it is envisioned that the systems 10 and/or 300 can be calibrated not to take a sample from the center of each stem 34, but rather target any other part of each stem 34. For example, in such instances the star wheel 122 can be used to detect a side of a stem 34 and this information can be used by the system controller to accurately target only certain tissues and/or layers of cells outside the stem center, e.g. the cells growing in the outer layers of the stem 34.

It is further yet envisioned that in various embodiments, the systems 10 and/or 300 described herein can be combined, in whole or in part, with the automated crop analysis and treatment system described in PCT application number PCT/US2015/045301, titled Apparatus And Methods For In-Field Data Collection And Sampling, filed Aug. 14, 2015, and incorporated herein by reference in its entirety. For example, the centering assembly 86 and/or the star wheel 122 can be one of various interchangeable tools/systems/assemblies that can be fixed to the robotic articulating arms described in the PCT/US2015/045301 application.

Additionally, in various embodiments, it is envisioned that the systems 10 and/or 300, described herein, can be part of a totally automated 'Smart' system, such as the system described in PCT Application PCT/US2015/045301, titled Apparatus And Methods For In-Field Data Collection And Sampling, filed Aug. 14, 2015, and corresponding U.S. Provisional Application 62/037,968, filed Aug. 15, 2014, the disclosure of each being incorporated by reference herein in their entirety. For example, in various embodiments it is envisioned that operation of the systems 10 and/or 300 can include one or more of the following actions/tasks/steps. Prior to operation of the systems 10 and/or 300 in the field, researchers can upload a set of electronic task specific itinerary instructions, e.g., algorithms, programs, routines, functions, etc., to the system controller 20. The itinerary instructions provide the specific steps and procedures to be implemented in acquiring the specified data for the respective task(s) to be performed by the systems 10 and/or 300. As used herein, task will be understood to mean a specific experiment(s) or data gathering operation(s) to be performed by the systems 10 and/or 300 at a given time as the systems 10 and/or 300 traverses a plot/field. Hence, for each different task (i.e., each different data gather operation) to be performed by the systems 10 and/or 300, the researcher can upload different itinerary instructions that provide the specific steps and procedures to be implemented in acquiring the specified data for each different task.

For example, the itinerary instructions can specify the one or more genotypic, phenotypic, or environmental characteristics of the plants/stem and/or surrounding area to be measured, and how to collect the data (e.g., what components of the systems 10 and/or 300 will be utilized to acquire the stipulated data). For example, the uploaded itinerary instructions can instruct the systems 10 and/or 300 to selectively inject the stems 34 (e.g., each stem 34 or certain selected stems 34) with one or more different inoculums. Or, the uploaded itinerary instructions can instruct the systems 10 and/or 300 to inject or perform other operations on certain selected stems 34 at first height (relative to the ground 38, while injecting other selected stems 34 at a second height. Or, the uploaded itinerary instructions can instruct the systems 10 and/or 300 to inject or perform other operations on certain selected stems 34 with a first amount of inoculum, while injecting other selected stems 34 with a second amount of inoculum. Furthermore, in various implementations, the instructions can instruct the mobile platform 12 to traverse the plot/field at different speeds based on weather readings, soil moisture levels, plant height, etc., and/or inject only the stems have reached a certain growth stage or only if they exhibit some characteristic or set of characteristics.

Itinerary instructions could also be uploaded to the data system controller 20 that stipulate about how to collect data on that particular day, for that particular task, or for a particular geospatial point in a field. For example, the itinerary instructions can stipulate how many injections per unit area are to be collected, or that certain plants or plots should be ignored (i.e., deactivated), or whether data should be collected differently in high humidity or temperature versus low humidity or temperatures. Additionally, itinerary instructions can be uploaded that dictate how and what injections are to be carried out and/or what data is to be collected and/or what subsequent course of action should be taken based on real-time analysis of the data collected. For example, if particular data collected and analyzed in real-time does not meet a certain stipulated threshold or fall within a specified range, or meet other stipulated criteria, the uploaded itinerary instructions can instruct the systems 10 and/or 300 to repeat the injection, and/or performance of other operations, and/or collection of such data, or skip injection of selected stems 34 to be injected, or ignore collected data, or modify/adjust collected data, or collect one or more types of additional or different data.

Furthermore, in various embodiments, historical and/or current data about the respective field(s), plot(s) and plants/stems 34 can be uploaded to, or accessed by, the system controller 20. Moreover, in various implementations, the itinerary instructions can instruct the system controller 20 to take into consideration such historical data previously collected for the respective field(s), plot(s) and plants/stems 34, and then based on this consideration, require execution of special or modified instructions for injecting (or not injecting) selected stems 34, acquiring (or not acquiring) data for particular field(s), plot(s) and/or plants/stems 34. Therefore, the historical data can be correlated in real-time with the data presently being collected do determine which, if any, courses of action should be implemented by the systems 10 and/or 300. For example, plot names or designations, germplasm and/or pedigrees of each plant/stem 34 to be injected and/or analyzed, row width and planting rates, geospatial data of any plant/stem or point in the field(s)/plot(s), previous or planned treatments (e.g., inoculation injections), geospatial areas in a field known to be contaminated or previously deactivated, etc., can all be correlated in real-time with the data being collecting, whereby any stipulated course of action can be determined and implemented as a result of the correlation and as stipulated by the itinerary instructions. In various embodiments, any given geospatial point in the field(s)/plot(s) can be assigned values for all the inoculation injections, and/or other operations performed, and/or data the system 10 has previously delivered, and/or performed, and/or acquired at that point.

The description herein is merely exemplary in nature and, thus, variations that do not depart from the gist of that which is described are intended to be within the scope of the teachings. Moreover, although the foregoing descriptions and the associated drawings describe example embodiments in the context of certain example combinations of elements and/or functions, it should be appreciated that different combinations of elements and/or functions can be provided by alternative embodiments without departing from the scope of the disclosure. Such variations and alternative combinations of elements and/or functions are not to be regarded as a departure from the spirit and scope of the teachings.

The invention claimed is:

1. A plant contact centering sensor for detecting, by physical contact, the presence of a plant stem growing in an environment with other plant stems, the sensor comprising:
    two or more arms;
    at least one stem receptacle formed at a junction of the two or more arms, the at least one stem receptacle comprises a leading face and a trailing face that join at a vertex of the respective stem receptacle, the at least one stem receptacle structured to physically receive a stem between the leading and trailing edges; and
    at least a portion of a centering sensor position assembly that is structured and operable to sense a rotational position of the centering sensor during actuation of the centering sensor.

2. The sensor of claim 1, wherein the at least a portion of the centering sensor position assembly is structured and operable to sense when the at least one stem receptacle is positioned in a Cradling position indicating a stem is positioned within the respective stem receptacle in a Cradled position whereby the stem is simultaneously in contact with both the leading and trailing face.

3. The sensor of claim 2, wherein the sensor comprises a plurality of stem receptacles and is structured such that at least one of stem receptacles has a centering line extending from a center of the sensor such that an approximate center point of a stem aligns substantially with the centering line of the respective stem receptacle when the respective stem is in the Cradled position.

4. The sensor of claim 3, wherein the sensor is star shaped having five arms and five stem receptacles formed therebetween, wherein the leading face and a trailing face of the stem receptacles join at a vertex having a vertex angle of between 90° and 120°.

5. The sensor of claim 2, wherein the at least a portion of the centering sensor position assembly comprises at least one contact sensor disposed along the leading face and the trailing face, the at least one contact sensor structured and operable to detect when a respective stem is in contact with the respective leading face and trailing face, thereby indicating that one of the at least one stem receptacles is positioned in the cradling position and the respective stem is in the Cradled position.

6. A plant contact centering assembly for detecting, by physical contact, the presence of a plant stem growing in an environment with other plant stems, the assembly comprising:
    a hub mountable to a platform;
    a plant contact centering sensor operably connected to the hub, the centering sensor comprising:
        two or more arms;
        at least one stem receptacle formed at a junction of the two or more arms, the at least one stem receptacle comprises a leading face and a trailing face that join at a vertex of the respective stem receptacle, the at least one stem receptacle structured to physically receive a stem between the leading and trailing edges; and
    a centering sensor position assembly that is structured and operable to sense a rotational position of the centering sensor during actuation of the centering sensor.

7. The assembly of claim 6, wherein the sensor comprises a plurality of stem receptacles and is structured such that at least one of stem receptacles has a centering line extending from a center of the sensor such that an approximate center point of a stem aligns substantially with the centering line of the respective stem receptacle when the respective stem is in the Cradled position.

8. The assembly of claim 7, wherein the sensor is star shaped having five arms and five stem receptacles formed therebetween, wherein the leading face and a trailing face of the stem receptacles join at a vertex having a vertex angle of between 90° and 120°.

9. The assembly of claim 6, wherein the centering sensor position assembly comprises at least one sensor pin disposed within the centering sensor and at least one position sensor disposed within the hub, the at least one position sensor structured and operable to sense when the at least one sensor pin is substantially aligned therewith, thereby indicating that one of the at least one stem receptacles is positioned in a cradling position.

10. The assembly of claim 6, wherein at least a portion of the centering sensor position assembly comprises at least one contact sensor disposed along the leading face and the trailing face, the at least one contact sensor structured and operable to detect when a respective stem is in contact with the respective leading face and trailing face, thereby indicating that one of the at least one stem receptacles is positioned in the cradling position and the respective stem is in the Cradled position.

11. A mechanized, non-disruptive plant contact sensing system for detecting, by physical contact, the presence of a plant stem growing in an environment with other plant stems, the system comprising:
a system platform; and
at least one plant contact sensing mechanism mounted to the system platform, wherein the at least one plant contact sensing mechanism comprises:
a guiderail; and
a plant contact centering assembly mounted to the guiderail, said assembly comprising:
a hub mountable to a platform;
a plant contact centering sensor operably connected to the hub, the centering sensor comprising:
two or more arms;
at least one stem receptacle formed at a junction of the two or more arms, the at least one stem receptacle comprises a leading face and a trailing face that join at a vertex of the respective stem receptacle, the at least one stem receptacle structured to physically receive a stem between the leading and trailing edges; and
a centering sensor position assembly that is structured and operable to sense a rotational position of the centering sensor during actuation of the centering sensor.

12. The system of claim 11, wherein the sensor comprises a plurality of stem receptacles and is structured such that at least one of stem receptacles has a centering line extending from a center of the sensor such that an approximate center point of a stem aligns substantially with the centering line of the respective stem receptacle when the respective stem is in the Cradled position.

13. The system of claim 12, wherein the sensor is star shaped having five arms and five stem receptacles formed therebetween, wherein the leading face and a trailing face of the stem receptacles join at a vertex having a vertex angle of between 90° and 120°.

14. The system of claim 11, wherein the centering sensor position assembly comprises at least one sensor pin disposed within the centering sensor and at least one position sensor disposed within the hub, the at least one position sensor structured and operable to sense when the at least one sensor pin is substantially aligned therewith, thereby indicating a present position of the centering sensor.

15. The system of claim 11, wherein the centering sensor position assembly comprises at least one sensor pin disposed within the centering sensor and at least one position sensor disposed within the hub, the at least one position sensor structured and operable to sense when the at least one sensor pin is substantially aligned therewith, thereby indicating that one of the at least one stem receptacles is positioned in a cradling position.

16. The system of claim 11, wherein at least a portion of the centering sensor position assembly comprises at least one contact sensor disposed along the leading face and the trailing face, the at least one contact sensor structured and operable to detect when a respective stem is in contact with the respective leading face and trailing face, thereby indicating that one of the at least one stem receptacles is positioned in the cradling position and the respective stem is in the Cradled position.

17. The system of claim 11 further comprising at least one of:
at least one plant operation device communicatively connected to the centering assembly such that operation of the at least one plant operation device is actuated by the centering sensor, wherein the at least one plant operation device comprises at least one of:
an injection assembly structured and operable to inject a stem with an agriculture treatment solution as the stem passes through a strike zone of the at least one plant contact sensing mechanism; and
a nozzle for spraying the agriculture treatment solution on at least one of at least one of the stem and an environment surrounding the stem.

18. The system of claim 17, wherein the agriculture treatment solution is one of:
an inoculum;
a pesticide:
a hormone;
a fertilizer; and
a soil treatment.

19. The system of claim 11 further comprising at least one of:
at least one data collection device communicatively connected to the centering assembly such that operation of the at least one data collection device is actuate by the centering sensor, wherein the at least one data collection device comprises at least one of:
a camera for acquiring image data of at least one of the plant and an environment surrounding the plant;
a soil sampler for acquiring samples of, and/or data from, the soil in which the at least one plant is growing;
a tissue sampler for acquiring samples of, and/or data from, a tissue of the at least one plant; and
an air sampler for acquiring samples of, and/or data from, the air surrounding the at least one plant.

20. The system of any of claim 11 further comprising a linkage assembly comprising a fixed member mounted to the guiderail of the at least one plant contact sensing mechanism, and a transition member movably connected to the fixed member and wherein at least one of at least one plant operation device and at least one data collection device are mounted to the linkage assembly.

* * * * *